US009600798B2

(12) United States Patent
Battles et al.

(10) Patent No.: US 9,600,798 B2
(45) Date of Patent: Mar. 21, 2017

(54) AUTOMATED MATERIALS HANDLING FACILITY

(71) Applicant: Amazon Technologies, Inc., Seattle, WA (US)

(72) Inventors: Jon Stuart Battles, North Bend, WA (US); Jayson Michael Jochim, Seattle, WA (US); Martin Peter Aalund, Seattle, WA (US); Ned Lecky, Vashon, WA (US); Samuel Gardner Garrett, Seattle, WA (US); Paul Roy Raines, Jr., Seattle, WA (US); Kaushik Mani, Seattle, WA (US); Yan Yan, Seattle, WA (US); David Henry Clark, Bellevue, WA (US); John Tan, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/857,668

(22) Filed: Sep. 17, 2015

(65) Prior Publication Data

US 2017/0043953 A1 Feb. 16, 2017

Related U.S. Application Data

(60) Provisional application No. 62/204,302, filed on Aug. 12, 2015.

(51) Int. Cl.
| | | |
|---|---|---|
| *G06Q 10/08* | (2012.01) | |
| *B65G 1/137* | (2006.01) | |
| *B25J 9/16* | (2006.01) | |
| *G05B 15/02* | (2006.01) | |
| *B65G 1/04* | (2006.01) | |
| *G06Q 50/28* | (2012.01) | |

(52) U.S. Cl.
CPC .............. *G06Q 10/087* (2013.01); *B25J 9/16* (2013.01); *B65G 1/04* (2013.01); *B65G 1/1373* (2013.01); *G05B 15/02* (2013.01); *G06Q 50/28* (2013.01)

(58) Field of Classification Search
CPC .......... B65G 1/1373; B25J 9/16; G06Q 50/08
See application file for complete search history.

(56) References Cited

U.S. PATENT DOCUMENTS

| | | | |
|---|---|---|---|
| 6,289,260 B1 * | 9/2001 | Bradley ............... | B65G 1/1373 414/273 |
| 7,246,706 B1 * | 7/2007 | Shakes ...................... | B07C 7/02 209/614 |

(Continued)

OTHER PUBLICATIONS

International Search Report and Written Opinion for PCT Application No. PCT/US2016/046634 mailed Oct. 21, 2016.

*Primary Examiner* — Thomas Randazzo
(74) *Attorney, Agent, or Firm* — Athorus, PLLC

(57) ABSTRACT

Disclosed are systems and methods for an automated materials handling facility. The automated materials handling facility uses a series of automated devices, such as automated guidance vehicles, mobile drive units, robotic arms, automated sorters, etc., to facilitate item receive, stow, pick, shipping and other aspects of materials handling. The automated devices are controlled by a materials handling control system that sends instructions to the various devices to coordinate operation of those devices and to coordinate flow of items through the materials handling system.

21 Claims, 13 Drawing Sheets

(56) References Cited

U.S. PATENT DOCUMENTS

| | | | | |
|---|---|---|---|---|
| 7,941,244 | B2* | 5/2011 | Somin | G06Q 50/24 |
| | | | | 235/385 |
| 7,974,891 | B2* | 7/2011 | Shakes | G06Q 10/0875 |
| | | | | 705/28 |
| 8,055,377 | B2* | 11/2011 | Yair | G06Q 10/08 |
| | | | | 414/273 |
| 8,594,835 | B2* | 11/2013 | Lert | B65G 1/045 |
| | | | | 414/267 |
| 8,798,784 | B1* | 8/2014 | Clark | G06Q 10/08 |
| | | | | 198/431 |
| 8,839,132 | B2* | 9/2014 | Reichert | G06Q 10/087 |
| | | | | 345/419 |
| 9,037,286 | B2* | 5/2015 | Lert | B65G 1/1378 |
| | | | | 414/279 |
| 9,129,247 | B2* | 9/2015 | Hara | G06Q 10/06315 |
| 9,270,478 | B2* | 2/2016 | Red | H04L 12/2803 |
| 2006/0122858 | A1* | 6/2006 | Miles | G06Q 10/00 |
| | | | | 705/28 |
| 2007/0150383 | A1 | 6/2007 | Shakes et al. | |
| 2011/0295644 | A1 | 12/2011 | Hara et al. | |
| 2013/0226649 | A1* | 8/2013 | Grissom | G06Q 10/06315 |
| | | | | 705/7.25 |
| 2015/0057793 | A1* | 2/2015 | Kawano | G06Q 10/087 |
| | | | | 700/216 |
| 2016/0129587 | A1* | 5/2016 | Lindbo | B65G 1/1378 |
| | | | | 700/218 |
| 2016/0140488 | A1* | 5/2016 | Lindbo | B65G 1/1373 |
| | | | | 705/28 |

* cited by examiner ial No. 62/204,302, filed Aug. 12, 2015 entitled

AUTOMATED MATERIALS HANDLING FACILITY

CROSS-REFERENCE TO RELATED APPLICATIONS

This application claims the benefit of U.S. Provisional Application No. 62/204,302, filed Aug. 12, 2015 entitled "Automated Materials Handling Facility," the contents of which are incorporated by reference herein in their entirety.

BACKGROUND

Many companies store, package, and ship items and/or groups of items from materials handling facilities. For example, many e-commerce companies and some traditional retail companies house inventory in a materials handling facility and ship items to various destinations (e.g., customers, stores) from the materials handling facility. Receipt of inventory in the materials handling facility, storage of inventory within the materials handling facility, shipping of items from the materials handling facility and the overall flow or movement of items within the materials handling facility (e.g., from receive to storage and/or from storage to shipping) is often labor intensive. In many instances, a single item may be handled by multiple human agents during a particular flow of the item through the facility. Multiple human interactions increase the costs to handle the item, the time to complete a flow of the item through the materials handling facility, and increase the opportunity for mishandling of the item.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
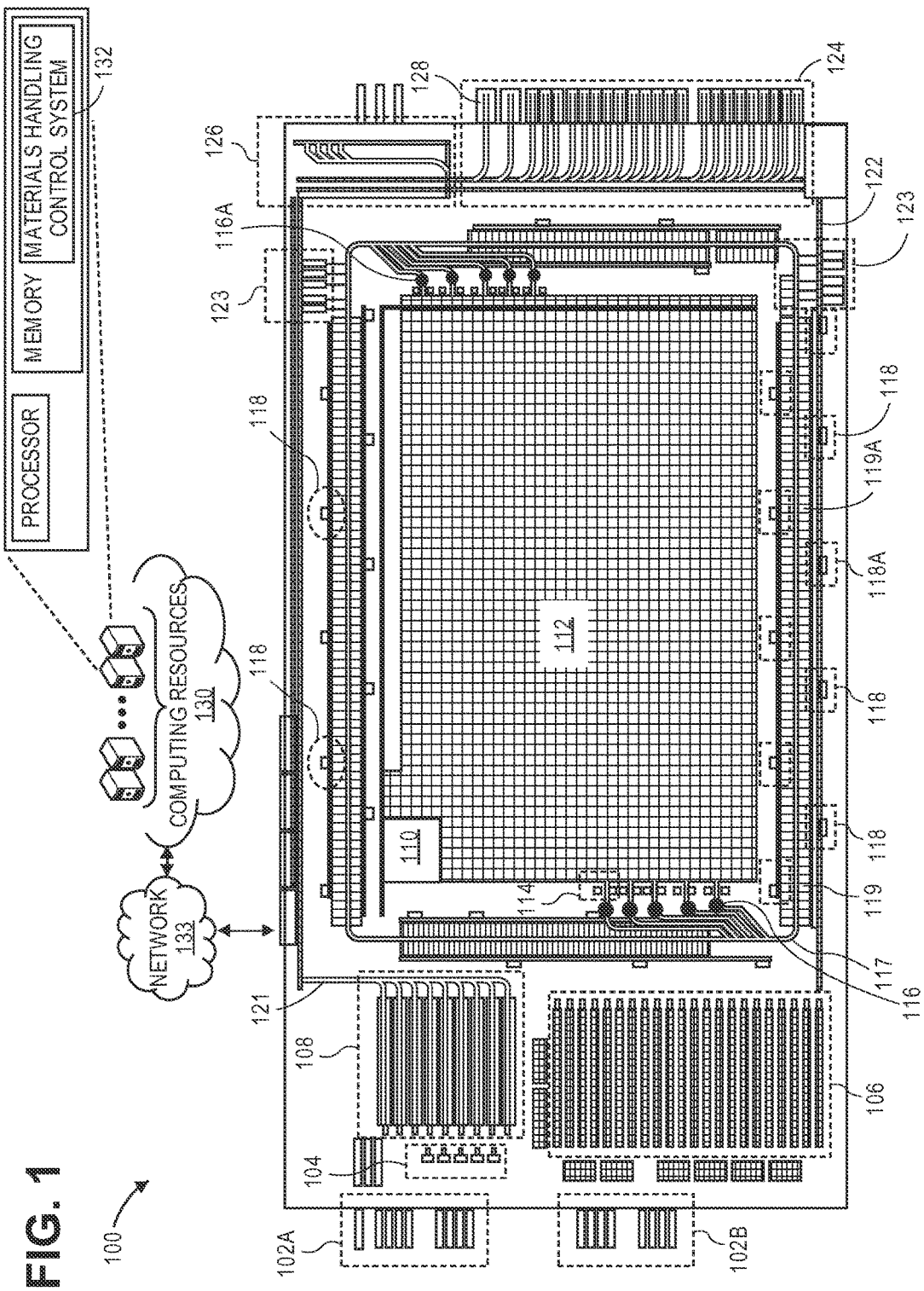
FIG. 1 illustrates an overhead view of a level of an automated materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Disclosed are systems and methods for an automated materials handling facility ("AMHF"). The AMHF uses a series of automated devices, such as automated guidance vehicles, mobile drive units, robotic arms, automated sorters, custom container forming devices, make-on-demand devices (e.g., three-dimensional printers), print-on-demand devices, etc., to facilitate item receive, stow, pick, pack, shipping, and other aspects of materials handling. The automated devices are controlled by a materials handling control system that sends instructions to the various devices to coordinate operation of those devices and to coordinate flow of items through the materials handling system.

In one implementation, items arrive at a receive station and are retrieved from a transportation vehicle by a first automated device, such as an automated guidance vehicle ("AGV"). For example, items may be stacked on a pallet, referred to herein as a receive pallet, that is delivered to a receive station via a transportation vehicle, such as a delivery truck. An AGV retrieves the receive pallet from the transportation vehicle and autonomously routes the receive pallet to a pre-sorting station. An AGV, as used herein, is an automated vehicle that can be operated in an area occupied by humans. Such systems have sensors and/or other collision avoidance capabilities.

At the pre-sorting station, a second automated device, such as a robotic arm, sorts the plurality of items that are stacked on the receive pallet. For example, the second automated device may receive instructions from the materials handling control system that include instructions for picking the items from the receive pallet and sorting the items to different sort pallets positioned at the pre-sorting station. Likewise, the instructions may also include corresponding information (e.g., unique identifiers, bar codes, quick response (QR) codes, radio frequency identification ("RFID") tag identifiers) that may be used to identify and/or detect the items stacked on the receive pallet.

Utilizing the instructions and the corresponding information, the second automated device at the pre-sorting station detects an item on the receive pallet, determines a sort pallet to which the item is to be sorted, picks the item from the receive pallet, and places the item on the determined sort pallet. This may be done for each item located on the receive pallet. Items may be sorted to various sort pallets based on, for example, the size or dimensions of the item, the structural integrity of the item (e.g., fragile, not fragile), the material composition or classification of the item (e.g., hazardous, flammable, corrosive, toxic), the inventory location to which the item will be stowed, the inventory area or level on which the item will be stowed, etc.

When a sort pallet has been stacked with items, a third automated device such as another AGV, retrieves the sort pallet from the pre-sort station and routes the sort pallet to an inventory induction station.

At the inventory induction station, the sort pallet is retrieved by a fourth automated device, such as a mobile drive unit positioned within the inventory area. The fourth automated device routes the sort pallet from the inventory induction station to a pick/stow station.

Different types of automated devices may operate in the inventory area compared to the receive station and/or shipping station of the materials handling facility. For example, the receive station and/or shipping station of the materials handling facility may be occupied by both humans and automated devices, such as AGVs. As such, the automated devices may be designed to avoid and/or collaborate with the humans to reduce any potential for human injuries or other accidents. In comparison, the inventory area within the materials handling facility may not be occupied by humans and may only include inventory, inventory holders, and automated devices configured to move inventory and/or inventory holders within the inventory area. In such a configuration, the automated devices within the inventory area do not need the additional sensors or collaborative capabilities to avoid humans. As such, the automated devices within the inventory areas may be manufactured and/or maintained at a lower cost.

At the pick/stow station, a fifth automated device, such as a robotic arm, positions a tote into which items will be picked and/or placed at a position within the pick/stow station so that a sixth automated device can pick and/or stow items out of or into the tote. To complete stow of the sorted items, the sixth automated device picks an item from the sort pallet and places the item in a cell of the tote. Likewise, as discussed further below, in addition to stowing items into a tote, the sixth automated device may also pick items associated with a shipment set from the tote and place those items on an induction transport for routing to a packing station. In addition, the sixth automated device may also pick items from one tote and place those items in a second tote to consolidate items into a single tote. As such, the automated devices at the pick/stow station may perform stow of inventory items into cells of a tote for storage in the inventory area, picking of items from cells of a tote for fulfillment of a shipment set, and/or consolidation of items among multiple totes.

As discussed below, totes may be configured to include one or more cells. Each cell holds either a single item or multiples of a same type of item. Likewise, each cell may have a corresponding unique identifier or position within a tote and/or the tote may be uniquely identified. In either configuration, the automated device can detect the tote and cell location within the tote and stow the item into the corresponding cell of the tote.

After one or more items have been picked or stowed into the tote, the fifth automated device places the tote on an inventory holder that is configured to hold multiple totes. Finally, a seventh automated device, such as a mobile drive unit, retrieves the inventory holder and routes the inventory holder from the pick/stow station to a particular inventory location within the inventory area and stows the inventory holder at the inventory location.

When the materials handling control system receives a request to fulfill a shipment set that includes one or more items, the materials handling control system determines inventory locations and/or inventory holders containing the requested item(s) and sends instructions to one or more automated devices within the inventory area to retrieve the inventory holder(s) from the inventory location(s) and route the inventory holder(s) to respective pick/stow stations. In some implementations, each inventory holder may be routed to a pick/stow station that is closest to the inventory location of the inventory holder.

When the inventory holder arrives at the pick/stow station, an automated device at the pick/stow station picks the tote containing the item from the inventory holder and positions the tote at a location within the pick/stow station so that another automated device at the pick/stow station can pick the item from a cell of the tote and place the item on an induction transport. As discussed further below, the induction transport routes the picked item to an automated sorter that routes the item to an assigned packing station.

When the item(s) arrive at the packing station, they are picked by an automated device at the packing station and placed by the automated device into a container. When all items corresponding to the shipment set are in the container, any extra dunnage needed is added by an automated device, the container is sealed by an automated device, labeled by an automated device, and routed via an automated conveyor to a shipping station. At the shipping station, the container is retrieved by an automated device and placed on a transportation unit that will initiate transport of the container to a destination.

As will be described further below, the AMHF can handle inventory items from receipt, to storage, to picking, to packing, and shipping in a fully automated manner, thereby decreasing handling and processing times for each item and reducing potential for mishandling of the items. Likewise, the implementations discussed herein provide single item destination sortation. For example, as items are received, they are sorted to single item storage destinations (cells of a tote). Likewise, when items are picked for shipping, they are individually picked and sorted to a single destination for packing into a container, and then the container is routed to shipping. In such a configuration, there is no longer a need for commingled inventory storing, batching, etc. As such, the time required to ingest and store items as well as pick items for shipping is greatly reduced.

As used herein, the term "container" may refer to any dimensionally-constrained environment, such as crates, cases, bins, boxes, or any other apparatus capable of storing one or more items. A "shipment set," as used herein, is one or more items that are to be processed through the materials handling facility and shipped or otherwise transported from the materials handling facility. A shipment set may include all items of an order, less than all items of an order, one or more items that are to be transferred from the materials handling facility to another location (e.g., to another materials handling facility), etc.

FIG. 1 illustrates an overhead view of one level of an AMHF 100, according to an implementation. As illustrated, the represented level of the AMHF 100 includes receive stations 102, pre-sort stations 104, high-velocity inventory storage areas 106, high-velocity pick areas 108, inventory induction stations 110, an inventory area 112, pick/stow stations 114, induction transports 116, an automated sorter 117, packing stations 118, packing slots 119, conveyor 122, container shipping station 124, and a flat item shipping station 126.

In some implementations, the AMHF 100 may include multiple levels. In such an implementation, one of the levels may be configured as illustrated in FIG. 1. Other levels may be configured to include an inventory induction station 110, an inventory area 112, pick/stow stations 114, and induction transports 116. As illustrated, each level may include multiple pick/stow stations 114 and corresponding induction transports 116. Each of the induction transports at each of the pick/stow stations 114 on the different levels induct items from the corresponding pick/stow station 114 to the automated sorter 117 on the level illustrated in FIG. 1. By routing items from different pick/stow stations 114 throughout each level to a single level and single automated sorter 117, all items are treated as singles and can be sorted to corresponding packing slots 119. An example pick/stow station is discussed in further detail below with respect to FIG. 3.

Likewise, because the automated sorter is a continuous conveyor and there are packing slots and packing stations distributed around the automated sorter 117, each item can be routed from an induction location, into the automated sorter and to a packing slot 119 in less than a single revolution around the automated sorter 117. For example, if an item is inducted into the automated sorter 117 by induction transport 116A and is assigned to packing slot 119A, the item will be routed by the automated sorter 117 from the induction transport 116A to the packing slot 119A in less than a single rotation around the automated sorter 117.

If there are other items corresponding to the shipment set that includes the item, those items are also picked from various inventory locations within an inventory area on one of the levels of the AMHF 100, routed to a pick/stow station 114, inducted into the automated sorter 117 by an induction transport 116 and routed by the induction sorter to the packing slot 119.

When all items of a shipment set have arrived at a packing slot 119, the items are picked by an automated device positioned at a packing station 118 associated with the packing slot 119 and packed into a container. Once all of the items have been packed into the container, one or more automated devices may add dunnage, add advertising materials, seal the container, label the container, and place the container on a conveyor 122 that routes the container to the shipping station 124. As illustrated, multiple packing stations are distributed around the automated sorter 117. An example configuration of a packing station 118 is discussed in further detail below with respect to FIG. 6.

As containers arrive at the shipping station 124, an automated device, such as an AGV, picks the containers and places the containers into a transportation vehicle 128 for transport from the AMHF 100.

Each of the automated devices within the materials handling facility, such as AGVs, robotic arms, and mobile drive units receive instructions from the materials handling control system 132. The materials handling control system may operate on computing resources 130. The computing resources 130, which may be local to the AMHF 100, remote from the AMHF 100, or a combination thereof, may form a portion of a network-accessible computing platform implemented as a computing infrastructure of processors, storage, software, data access, and other components that is maintained and accessible via a network 133, such as a wireless or wired network (e.g., the Internet). As illustrated, the remote computing resources 130 may include one or more servers. The servers may be arranged in any number of ways, such as server farms, stacks, and the like. An example computer system is discussed below with respect to FIG. 13.

As discussed further below, when items are received at a receive station 102, such as receive station 102A, or high-velocity receive station 102B the materials handling control system 132 determines the items at the receive station and a first automated device, such as an AGV, within the receive station retrieves the items from the receive station and routes the items to the pre-sorting station 104.

At the pre-sorting station 104, the items on the receive pallet are sorted by a second automated device, such as a robotic arm, onto various sort pallets. As illustrated, multiple pre-sorting stations 104 may be included in the AMHF 100, each pre-sorting station including an automated device and corresponding sort pallets. Pre-sorting station 104 is discussed in further detail below with respect to FIG. 2.

When a sort pallet is stacked with sorted items, a third automated device, such as another AGV, retrieves the sort pallet and routes the sort pallet to an inventory induction station 110. At the inventory induction station, a fourth automated device, such as a mobile drive unit positioned within the inventory area, retrieves the sort pallet from the inventory induction station 110 and routes the sort pallet to a pick/stow station 114. As discussed in further detail below with respect to FIG. 3, automated devices at the pick/stow station pick items from the sort pallet, stow those items into individual cells of one or more totes, and place the one or more totes onto one or more inventory holders. Finally, another automated device, such as a mobile drive unit positioned within the inventory area 112, retrieves the inventory holder from the pick/stow station, routes the inventory holder to an inventory location within the inventory area, and stows the inventory holder at the inventory location.

When a shipment set fulfillment request is received by the materials handling control system 132, the materials handling control system identifies inventory holder(s) that contain the item(s) associated with the shipment set. For each inventory holder, an automated device, such as a mobile drive unit positioned within the inventory area picks the inventory holder from the inventory location and routes the inventory holder to a pick/stow station.

At the pick/stow station 114, a first automated device picks a tote from the inventory holder and positions the tote such that a second automated device positioned at the pick/stow station can pick an item from a cell of the tote. As discussed further below, the instructions from the materials handling control system 132 may identify the cell position within the tote such that the second automated device can pick the item from the specified cell position. In some implementations, the cell configuration of a tote may be modified by an automated device at the pick/stow station, such as the second robotic arm, by removing, adding and/or repositioning a cell divider within a tote. Totes are discussed in more detail below with respect to FIGS. 4A-4B, and FIGS. 5A-5D.

Upon picking of the item, the second automated device places the item on the induction transport which autonomously inducts the item into the automated sorter 117. The induction transport 116 may be any form of conveyor. In some implementations, the induction transport is a gravity feed conveyor, slide or spiral and the items are routed along the spiral under the force of gravity from the pick/stow station into the automated sorter. In other implementations, the induction transport may be a belt-driven conveyor that routes the items from the pick/stow station to the automated sorter. It will be appreciated that any form of conveyance that can be used to autonomously route items from a pick/stow station to the automated sorter may be utilized with the implementations discussed herein. As discussed above, in some implementations, the induction transport may be used to route a picked item from a pick/stow station on one level of the AMHF to the automated sorter on a different level of the AMHF.

As items associated with a shipment set are inducted to the automated sorter, the position on the automated sorter is maintained by the materials handling control system 132. The automated sorter 117 continuously moves around the AMHF 100. For example, as illustrated in FIG. 1, the automated sorter is a continuous conveyor that encompasses the inventory area 112. The automated sorter 117 may be, for example, a cross-belt sorter that is configured to sort items into packing slots on either side of the automated sorter 117. In such an implementation, the induction transport 116 inducts items onto cross belts of the automated sorter 117 and the materials handling control system 132 maintains position information for the item on the cross belt of the automated sorter 117. In other implementations, the automated sorter may be tilt tray sorter, container sorter, etc.

As the conveyor moves inducted items past packing slots 119, which may be disposed on either side of the automated sorter 117, when the item is adjacent a packing slot assigned to the item and/or the shipment set for the item, the automated sorter 117 dispatches the item into the packing slot 119. For example, if the item is to be routed to packing slot 119A, when the cross belt of the automated sorter 117 that is carrying the item is adjacent the packing slot 119A, the instructions cause the cross belt to rotate, which moves the item off of the automated sorter 117 and into the packing slot 119A.

One or more packing slots may be associated with a packing station 118 and multiple packing stations 118 may be distributed around the automated sorter 117. One or more automated devices at the packing station pick the items from the packing slot, place the items in a container, include any needed dunnage and/or advertising or other materials in the container, seal the container, label the container and place the container on a conveyor 122. An example packing station configuration is discussed further below with respect to FIG. 6.

The conveyor 122 routes the containers that contain the items to a shipping station 124 or 126. For example, containers having at least minimum defined dimensions may be routed to shipping station 124. For example, boxes that contain items may be routed to shipping station 124. In comparison, containers having dimensions that are less than the minimum defined dimensions may be routed to shipping station 126. For example, envelopes and/or flat packages may be routed to shipping station 126.

One or more automated devices at the shipping stations 124, 126 retrieve the items as they arrive at the shipping station via the conveyor 122 and place those items into a transportation vehicle 128. For example, an AGV at the shipping station 124 may retrieve containers from the conveyor 122 and route those containers onto a transportation vehicle 128. Alternatively, or in addition thereto, the conveyor 122 may divert containers onto conveyors that terminate within or near a transportation vehicle. At shipping station 126, containers (e.g., envelopes, flats) may be discharged from the conveyor 122 into a Gaylord or other form of larger container. When the larger container fills with containers from the conveyor 122, an automated device, such as an AGV, picks and routes the larger container onto a transportation vehicle 128 so that the items can be transported from the AMHF 100.

In some implementations, one or more other automated devices may be included in the shipping station 126 that automatically form Gaylords or other larger containers from blank corrugate and place those formed larger containers onto pallets. As the larger containers are formed and needed, they may be routed by another automated device, such as an AGV, to a position within the shipping station 126 so that containers from the conveyor 122 can be loaded or otherwise placed into the larger container.

In some implementations, the AMHF 100 may include a receive station 102B that is configured to receive high-velocity items and/or non-inventory items. High-velocity items are items that are ordered or shipped from the AMHF 100 on a frequent or highly recurring basis, and/or that are anticipated to be ordered or shipped from the AMHF 100 on a frequent or highly recurring basis. For example, a high-velocity item may be a newly released toy that is anticipated to be ordered by a large volume of customers over a short period of time. Non-inventory items are any items that are received into the AMHF 100 that are not to be shipped in the same form from the AMHF 100. Non-inventory items may include corrugate that may be used for forming containers, raw materials that are used to form ordered items on demand (e.g., using three-dimensional printers, print-on-demand machines), etc.

As items are received at the high-velocity receive station 102B, the materials handling control system 132 determines the items and an automated device, such as an AGV, retrieves the items from the receive station 102B and routes the items to a high-velocity inventory storage area 106. In such a configuration, the high-velocity items may be stored in stacked pallets within the high-velocity inventory storage area 106. In some implementations, instructions from the inventory control system may cause the automated device to route the items to a location within the high-velocity pick area 108. Alternatively, or in addition thereto, the materials handling control system 132 may send instructions to an automated device to pick inventory items from the high-velocity inventory storage area 106 and route those inventory items to the high-velocity pick area 108. In either configuration, high-velocity items and non-inventory items may be stored in the high-velocity inventory storage area 106 and used to replenish high-velocity items stored in the high-velocity pick area 108.

In some implementations, items received into the AMHF 100 at either the receive station 102A or the receive station 102B that are to be shipped from the AMHF 100 without being placed in a container may be stored in the high-velocity pick area 108.

When a shipment set for a high-velocity item or an item that is to be shipped from the AMHF 100 without being placed into another container is received by the materials handling control system 132, the materials handling control system 132 sends instructions to an automated device positioned within the high-velocity pick area 108 that causes the automated device to pick the item from the high-velocity pick area and place the item on a conveyor 122. For example, the automated device may be a railed automated picking robotic device configured to pick items from pallets and route those items to the conveyor 122.

Instructions from the materials handling control system 132 cause the conveyor to route items, such as high-velocity items, that are to be packed in another container prior to shipping to a single item packing station 123. At the single item packing station 123, one or more automated devices receive the item, pack the item in a container, add any needed dunnage into the container, seal the container, label the container, and route the container to shipping station 126 or 124 for placement onto a transportation vehicle so that the item can be transported from the AMHF. If the item on the conveyor 122 is not to be placed into a container (i.e., it will be transported from the AMHF 100 in its own container), the instructions cause the conveyor 122 to route the item directly to a shipping station 124, 126 for placement into a transportation vehicle 128 so that the item can be transported from the AMHF 100.

By maintaining high velocity items and/or items that are transported from the AMHF 100 without being placed into another container in a high-velocity picking area 108, the items, when requested, can be quickly picked, (optionally) packed and routed to the shipping station. In such a configuration, the items do not need to be routed along the automated sorter 117 to a packing slot where they may be combined with other items of the shipment set and packed into a container with those other items. In contrast, the requested item is routed directly to a single item packing station 123 and packed as an individual item in a container and sent to a shipping station for transport. Such a direct route reduces the time between a request, such as an order, for the item and transport of the item from the AMHF 100.

Likewise, for make-on-demand items, such as books, compact-discs, video disks (e.g., DVDs, Blu-ray Discs), or components that can be fabricated with a three-dimensional printer, those items may be fabricated and routed directly to a packing station. For example, when an order for a make-on-demand item is received, the item may be fabricated at a make-on-demand station (not shown), and routed via a conveyor directly to a single item packing station 123, or to a packing slot 118.

While the example implementations described herein reference AGVs, mobile devices, and robotic arms as automated devices, it will be appreciated that other automated devices may likewise be utilized. For example, rather than utilizing mobile drive units to stow or retrieve inventory, the inventory area may be configured to utilize shuttles, a rail system, cranes, unmanned aerial vehicles, etc. to automate the stow and/or retrieval of items from within the inventory area.

Figure 2:
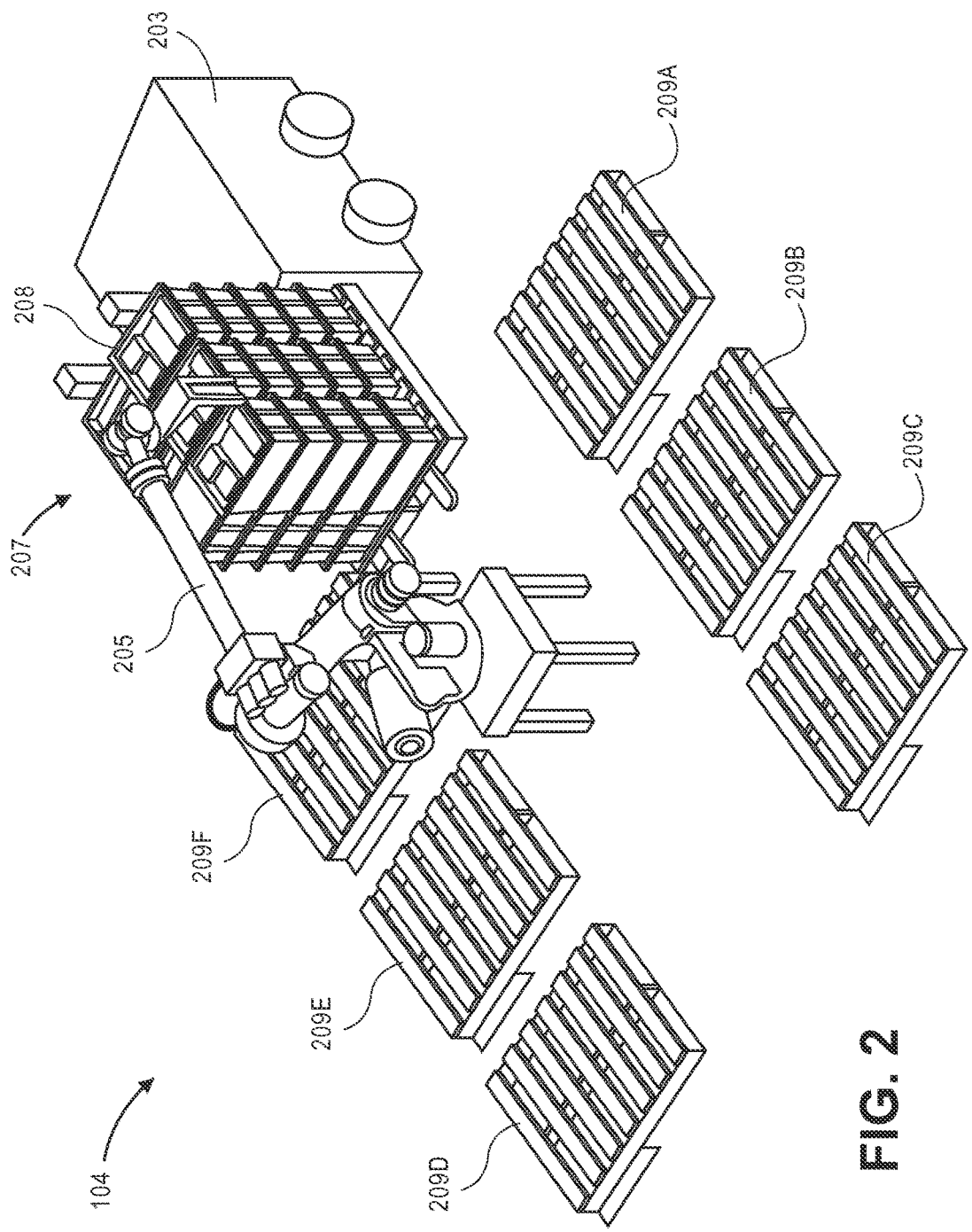
FIG. 2 is a diagram of a pre-sorting station of the automated materials handling facility, according to an implementation.

FIG. 2 is a diagram of a pre-sorting station 104 of the AMHF 100, according to an implementation. The pre-sorting station 104 includes an automated device 205, such as a robotic arm, that is in communication with and receives instructions from the materials handling control system 132. Likewise, the pre-sorting station 104 includes two or more sort pallets 209 onto which items are placed by the automated device 205 for sorting. In this example, the pre-sorting station 104 includes six sort pallets 209A, 209B, 209C, 209D, 209E, 209F.

As discussed above, when items arrive at a receive station, the materials handling control system 132 sends instructions to an automated device 203, such as an AGV, to retrieve the receive pallet 207 of items and route the receive pallet 207 to a pre-sorting station 104.

An automated device 205 at the pre-sorting station 104 also receives instructions from the materials handling control system that cause the automated device 205 to pick items from the receive pallet 207 and place each item on a corresponding sort pallet 209. The instructions may include an identification of each item and/or a position of each item on the receive pallet. Alternatively, as illustrated in FIG. 2, each item received into the AMHF may be positioned in a tote 208 and the automated device 205 may be configured to detect the position of the tote, detect an identifier of the tote and engage the tote so that the tote and the item(s) included in the tote can be picked from the receive pallet. For example, each tote 208 may include a tote identifier (e.g., barcode, QR code) that is detected by the automated device 205 that identifies the tote and/or indicates a position or orientation of the tote 208.

In such an implementation, the materials handling control system maintains in a data store information associating each item with a tote identifier. The instructions sent to the automated device 205 may include information indicating the tote identifiers associated with the totes on the receive pallet 207 and identifying a sort pallet 209 onto which the tote 208 of items is to be placed. The automated device 205, upon picking the tote from the receive pallet, determines the tote based on the tote identifier and places the tote on the correct sort pallet 209. This process may be repeated for each item or tote containing items on the receive pallet.

In some implementations, the materials handling control system may sort items to different sort pallets 209 based on, for example, the size or dimensions of the item, the structural integrity of the item (e.g., fragile, not fragile), the material composition or classification of the item (e.g., hazardous, flammable, corrosive, toxic), the inventory location to which the item will be stowed, the inventory area or level on which the item will be stowed, the velocity or speed at which the item is ordered and shipped from the AMHF, etc. As a sort pallet 209 is filled, instructions sent to another automated device by the materials handling control system cause the other automated device to pick the sort pallet 209 from the pre-sorting station 104 and route the sort pallet to another location, such as an inventory induction station. In some implementations, the automated device may already be positioned at the sort pallet and available to transport the sort pallet 209 from the pre-sorting station 104 and route the sort pallet to another location, such as an inventory induction station. Likewise, another automated device, such as another AGV, may receive instructions that cause that automated device to deliver and place another empty pallet at the pre-sort station such that the empty pallet can be utilized as a sort pallet 209.

Figure 3:
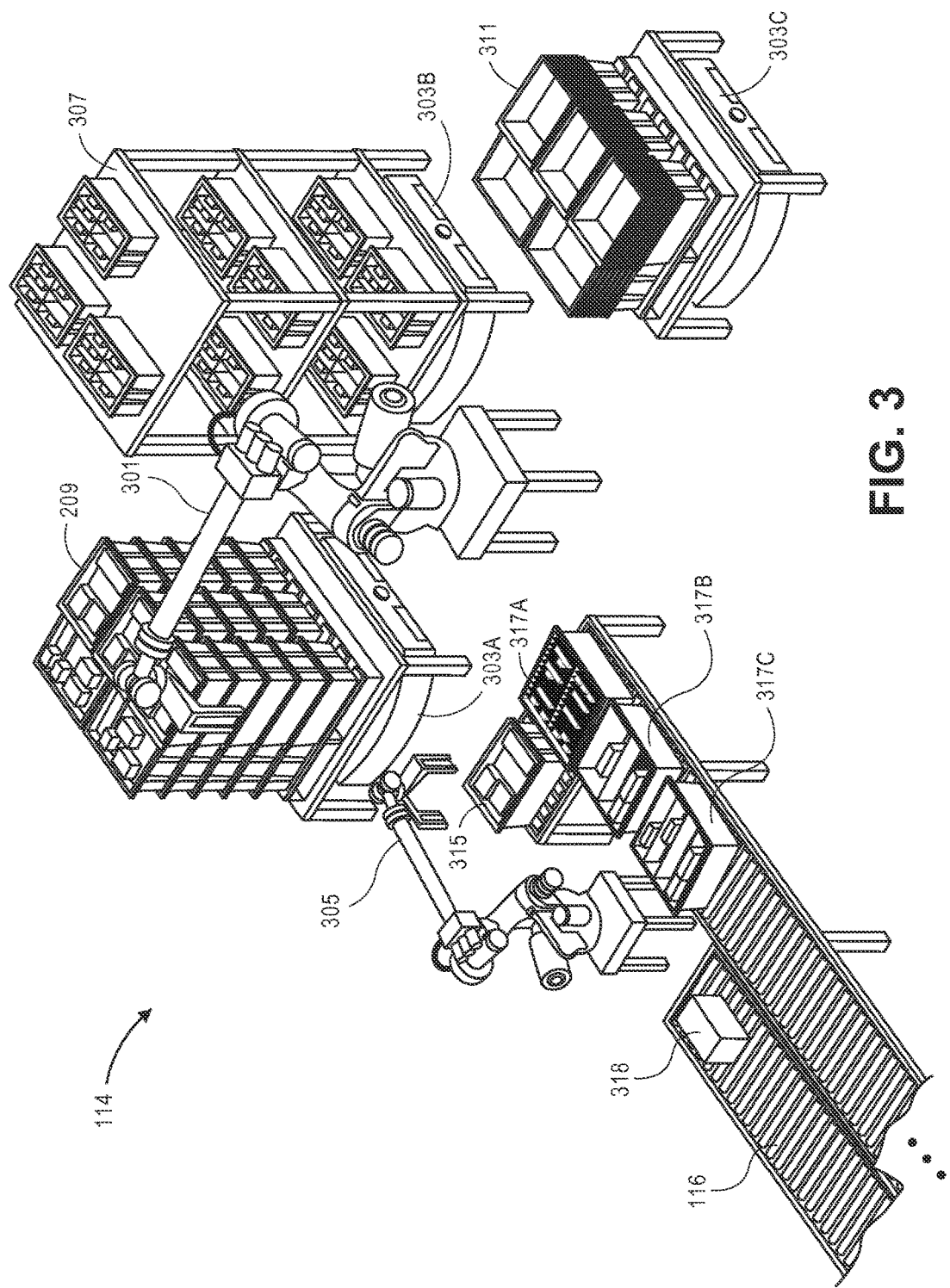
FIG. 3 is a diagram of a pick/stow station of the automated materials handling facility, according to an implementation.

FIG. 3 is a diagram of a pick/stow station 114 of the AMHF, according to an implementation. As discussed above, the pick/stow station 114 provides the functions of item pick for a shipment set, item stow for placing items into cells of totes that are positioned on an inventory holder 307 and stored at an inventory location within an inventory area of the AMHF, repositioning of items between cells of totes for consolidation of totes, and/or reconfiguration of cells of totes by autonomously repositioning the dividers within the totes.

To facilitate pick/stow operations, the materials handling control system sends instructions to a first automated device 303A, such as a mobile drive unit, that cause the first automated device 303A to route a sort pallet 209 from the induction station, discussed above, to the pick/stow station 114. Likewise, instructions are sent to a second automated device 303B that cause the second automated device to route an inventory holder 307 to the pick/stow station 114. The inventory holder may be retrieved from an inventory location within an inventory area of the AMHF. The inventory holder 307 is configured to store totes that contain inventory and is configured such that it may be autonomously transported by an automated device. In other implementations, other forms of automated storage and retrieval may be used to route an inventory holder, tote, and/or inventory to the pick/stow station.

Finally, a third automated device 303C may receive instructions that cause the third automated device to route a pallet to the pick/stow station that is used to store and/or move empty totes 311.

As will be appreciated, different automated devices may be used to route different sort pallets 209, different inventory holders 307, and/or different pallets for storing empty totes 311 to and from the pick/stow station depending on the operation(s) to be performed and/or the items to be handled.

The functions of the pick/stow station (pick/stow) may be performed in series and with respect to the same totes and/or pallets. For example, the materials handling control system may send instructions to a first automated device 301 positioned at the pick/stow station, such as a robotic arm, that cause the first automated device 301 to pick a tote 315 from the sort pallet 209 and place the tote 315 at a first position within the pick/stow station 114. The instructions may also cause the first automated device 301 to pick a tote 317A from the inventory holder 307 and position the tote 317A at a second position within the pick/stow station 114, as illustrated.

Likewise, the materials handling control system sends instructions to the second automated device 305 positioned within the pick/stow station 114, such as a second robotic arm, that cause the second automated device 305 to pick an item from the tote 315 and place the item into a cell of tote 317A. The instructions may include information that identifies the item to be picked from the tote 315 and cell position information indicating a specific cell within the tote 317A into which the item is to be placed.

The second automated device 305 utilizes the information to determine the item in the tote 315 to pick and to determine the cell within the tote 317A into which the item is to be placed. In one example, the second automated device 305 may use an image capture device to scan the items in the tote 315 to detect the item and the position of the item within the tote prior to picking the item from the tote 315. Likewise, the cell configuration of the tote 317A may be known and the second automated device may place the item in a specific cell within the tote. In some implementations, the second automated device may also use vision to confirm a position or configuration of the cells and the placement of the tote within the cells.

As an alternative to placing an item picked from the tote 315 into a cell of the tote 317A, the instructions from the materials handling control system may cause the second automated device to pick a specific item from the tote 315 and place the item 318 on the induction transport 116. This may be done if an item included in the tote 315 has been associated with a shipment set that is to be fulfilled.

Alternatively, while the tote 317A is positioned at the pick/stow station 114, in addition to placing items picked from tote 315 into cells of the tote 317A, the materials handling control system may send instructions to the second automated device 305 that cause the second automated device 305 to pick an item from a specific cell of the tote 317A and place the item on the induction transport 116. For example, the second automated device may pick item 318 from a cell of the tote 317A in response to instructions from the materials handling control system that instruct the second automated device to perform a pick action and identify a position or identifier of a cell within the tote 317A from which the item is to be picked.

In some implementations, the first automated device 301, or other automated devices, may place multiple totes, such as totes 317A, 317B, 317C onto a conveyor of the pick/stow station 114. In such a configuration, the instructions from the material handling control system may instruct the second automated device 315 to pick items from the tote 315 obtained from the sort pallet 209 and place those items into cells of the different totes 317A, 317B, 317C. Likewise, the materials handling control system may send instructions to the second automated device to pick one or more items from one or more cells of the totes 317A, 317B, 317C and place the one or more items on the induction transport 116 so that the item(s) are routed to a packing station for fulfillment of one or more shipment sets.

Still further, the materials handling control system may send instructions to the second automated device that cause the second automated device to pick an item from a cell of one of the totes 317A, 317B, 317C and place the item in a cell of another tote 317A, 317B, 317C. For example, if tote 317B includes only one remaining item, the materials handling control system may send instructions to the second automated device that cause the second automated device 305 to pick the item from the cell of the tote 317B and place the item in a cell of tote 317C.

In yet another example, the materials handling control system may send instructions to the second automated device that cause the second automated device to add, remove, and/or reposition one or more dividers within a tote. For example, after removing the final item from tote 317B, the materials handling control system may send instructions to the second automated device 305 that cause the second automated device to 305 to reconfigure the cell dividers within the tote 317B.

Figure 4B:
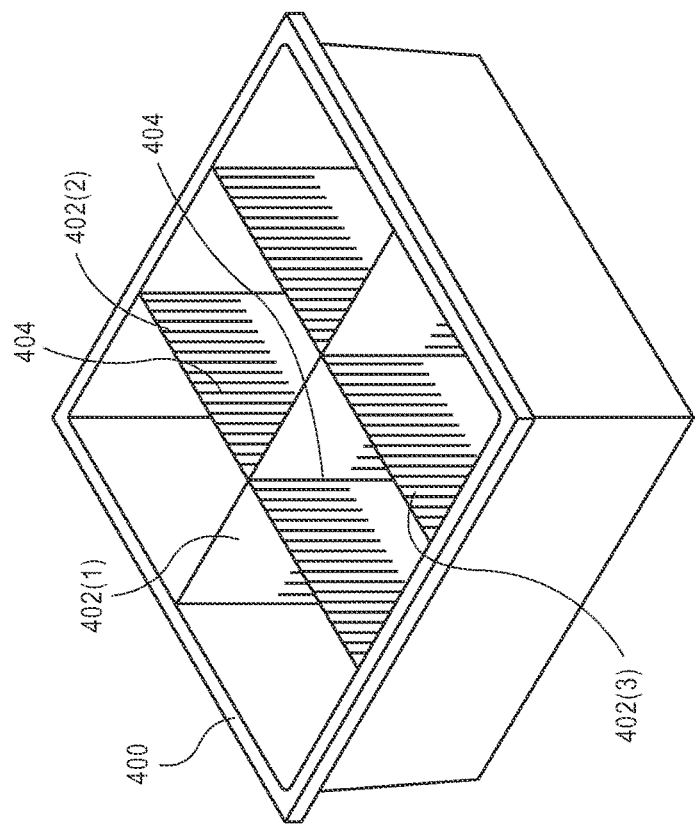
FIGS. 4A-4B are diagrams of a tote with cell dividers, according to an implementation.
Figure 4A:
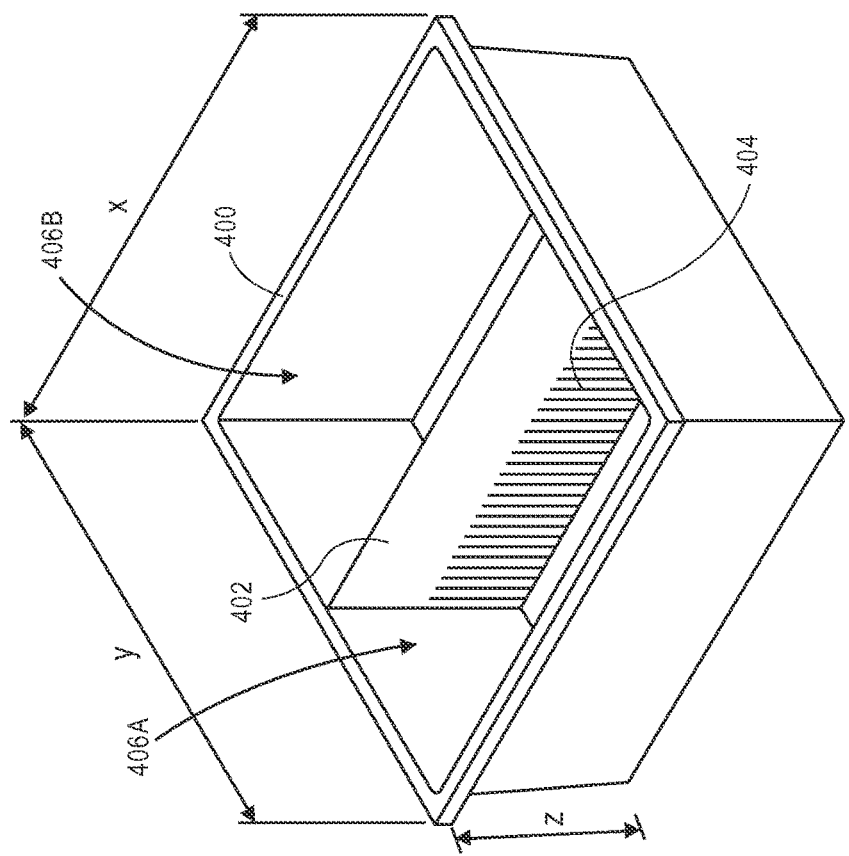

FIGS. 4A-4B are diagrams of a tote with cell dividers, according to an implementation. As illustrated, the tote 400 may be substantially square shaped so that a single size divider 402 may be used in any orientation within the tote 400. For example, the length of the tote 400, represented as "x" in FIG. 4A, may be approximately the same as the width of the tote 400, represented as "y" in FIG. 4A. In other implementations, the length and the width of the tote 400 may be different and different size dividers may be utilized.

The tote 400 has a depth, represented as "z" in FIG. 4A. Likewise, the tote may be tapered in the depth direction such that the top or opening of the tote is larger than the exterior bottom of the tote, to facilitate nesting of the totes for storage. Likewise, one or more indentations, not shown, may be utilized as legs or stands to facilitate stacking of totes when items are contained in the totes. Nesting and stacking of totes is known in the industry and will not be discussed in further detail herein. The inside walls and/or bottom of the tote 400 may also include grooves or ridges to facilitate placement of the dividers 402.

The divider 402 has a length that is substantially equal to the inner length and/or width of the tote 400 and may be tapered at approximately the same angle as the tote so that the divider can be positioned within the tote 400. Likewise, the height of the divider 402 may be the same as or less than the depth of the tote 400 so that the dividers reside in the tote. In some implementations, the inner walls of the tote 400 may have ridges or grooves (not shown) into which the dividers 402 may be positioned to aid in keeping the dividers vertical and stationary when placed in the tote 400.

The divider may also have one or more slots 404 that may be used to intersect with other dividers and form cells within the tote. A tote 400 may be configured to have any number, size and/or shape of cells based on the number and arrangement of the dividers 402 within the tote 400. For example, if no dividers are included in the tote, the tote is a single cell tote and only a single item is positioned in the tote. In some implementations, multiple items of a same type may be positioned in the same cell of a tote. In such instances, because the items are the same type, it does not matter which of the items are picked to fulfill a shipment set that includes the item. For example, a single cell may include multiple copies of a magazine. When a shipment set is received that includes a request for a copy of the magazine, any of the copies of the magazine contained in the cell may be picked and used to fulfill the request. For purposes of the discussion herein, it will be discussed that a single item is positioned in each cell. However, it should be appreciated that, in some instances, multiple items of the same type (e.g., magazines) may be placed in a single cell.

If a single divider 402 is positioned in the tote 400, such as illustrated in FIG. 4A, the tote has two cells 406A, 406B. Depending on the position of the divider 402 within the tote, the cells 406A, 406B may be the same or different sizes. A single item of the same or different type may be positioned in each of the two cells 406A, 406B.

Turning to FIG. 4B, illustrated is a tote 400 that includes three dividers 402(1), 402(2), 402(3) that have been positioned within the tote 400. As illustrated, dividers 402(2) and 402(3) have been positioned in parallel and the slots 404 of the dividers are oriented toward the top or opening of the tote 400. The divider 402(1) has been positioned perpendicular to dividers 402(2), 402(3) and the slots 404 are oriented downward toward the base of the tote 400. By orienting the slots of intersecting dividers in opposite directions, the dividers interlock, fit into the cavity of the tote 400, and create cells within the tote 400. For example, the three dividers within the tote 400 illustrated in FIG. 4B establish six cells within the tote 400. Each cell may be used to contain a single item of the same or different types. As such, the tote 400 may contain six items of any type and each item is associated with an individually addressable location within the tote 400 such that an automated device can be instructed to pick an item from within a particular cell of the tote and/or place an item into a particular cell of the tote.

Figure 5A:
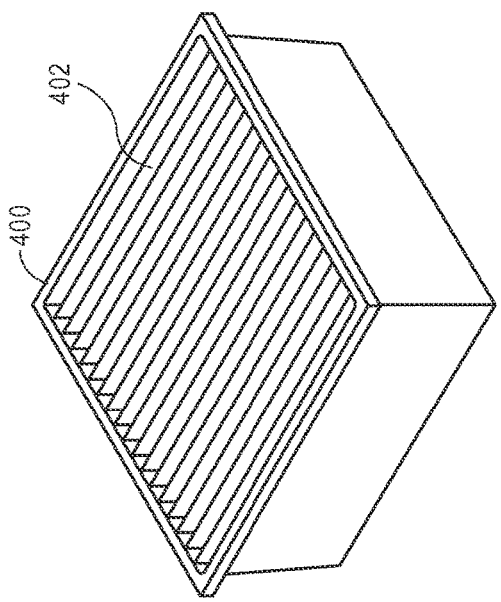
FIGS. 5A-5D are diagrams of totes with different cell configurations, according to an implementation.
Figure 5C:
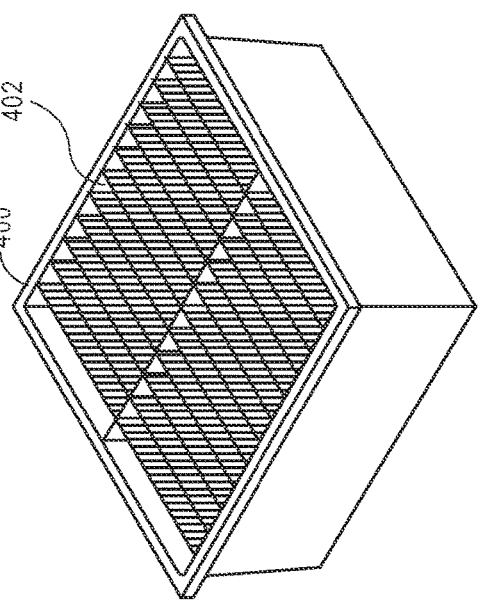
Figure 5B:
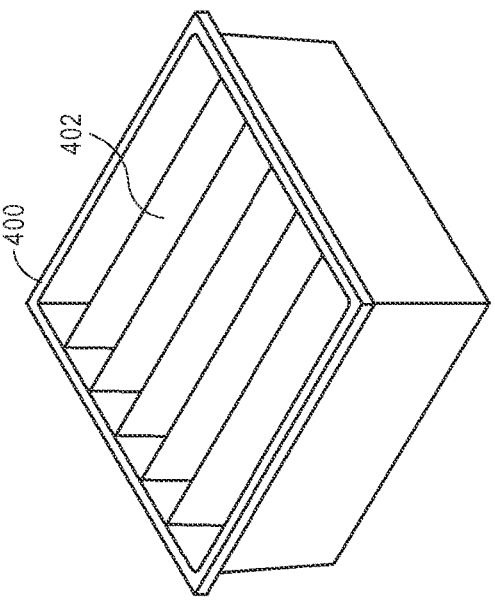
Figure 5D:
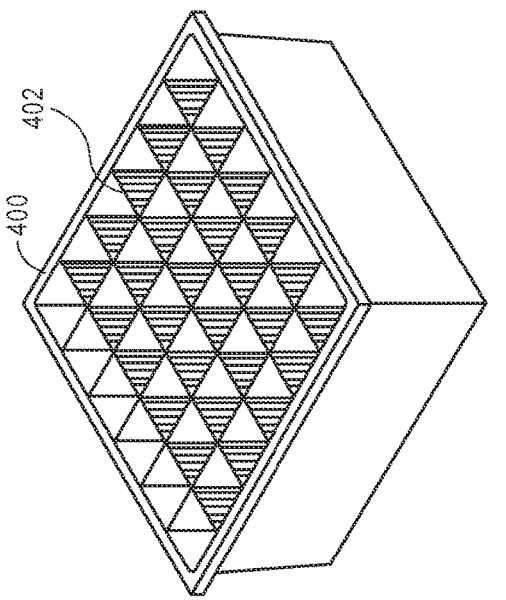

FIGS. 5A-5D are diagrams of totes with different cell configurations, according to an implementation. For example, FIG. 5A illustrates a tote 400 that includes five dividers 402 arranged in parallel and spaced approximate equal distances. Such a configuration provides a tote with six cells. FIG. 5B illustrates a tote 400 that includes seventeen dividers 402 arranged in parallel and spaced approximately equal distances. Such a configuration provides a tote with 18 cells. FIG. 5C illustrates a tote 400 that includes a first set of five dividers 402 arranged in parallel in a first orientation within the tote 400 and a second set of five dividers 402 arranged in parallel in a second orientation within the tote 400, such that the first set of dividers are perpendicular to and intersect the second set of dividers, thereby creating thirty-six cells within the tote 400 into which single items may be placed. FIG. 5D illustrates a tote 400 that includes a first set of eleven dividers 402 arranged in parallel in a first direction within the tote 400 and a twelfth divider 402 arranged in a perpendicular direction that intersects the first set of dividers, thereby creating twenty-four cells into which single items may be placed.

As will be appreciated, depending on the number and arrangement of the dividers 402 within the tote 400, any number and size of cells can be established into which items may be placed. In some implementations, the cell configuration of totes may be determined based on the size and shape of the items to be stowed in the cells of the totes. For example, ranges of sizes of items and the quantity of sizes of those items may be determined for an inventory area and totes may be configured with cells that will accommodate the sizes and quantity of items. Likewise, in some implementations, the second automated device 305 (FIG. 3) within the pick/stow station may receive instructions from the materials handling control system that cause the second automated device to add, remove and/or reposition dividers within a tote, thereby altering the configuration and/or number of cells within the tote 400.

Figure 6:
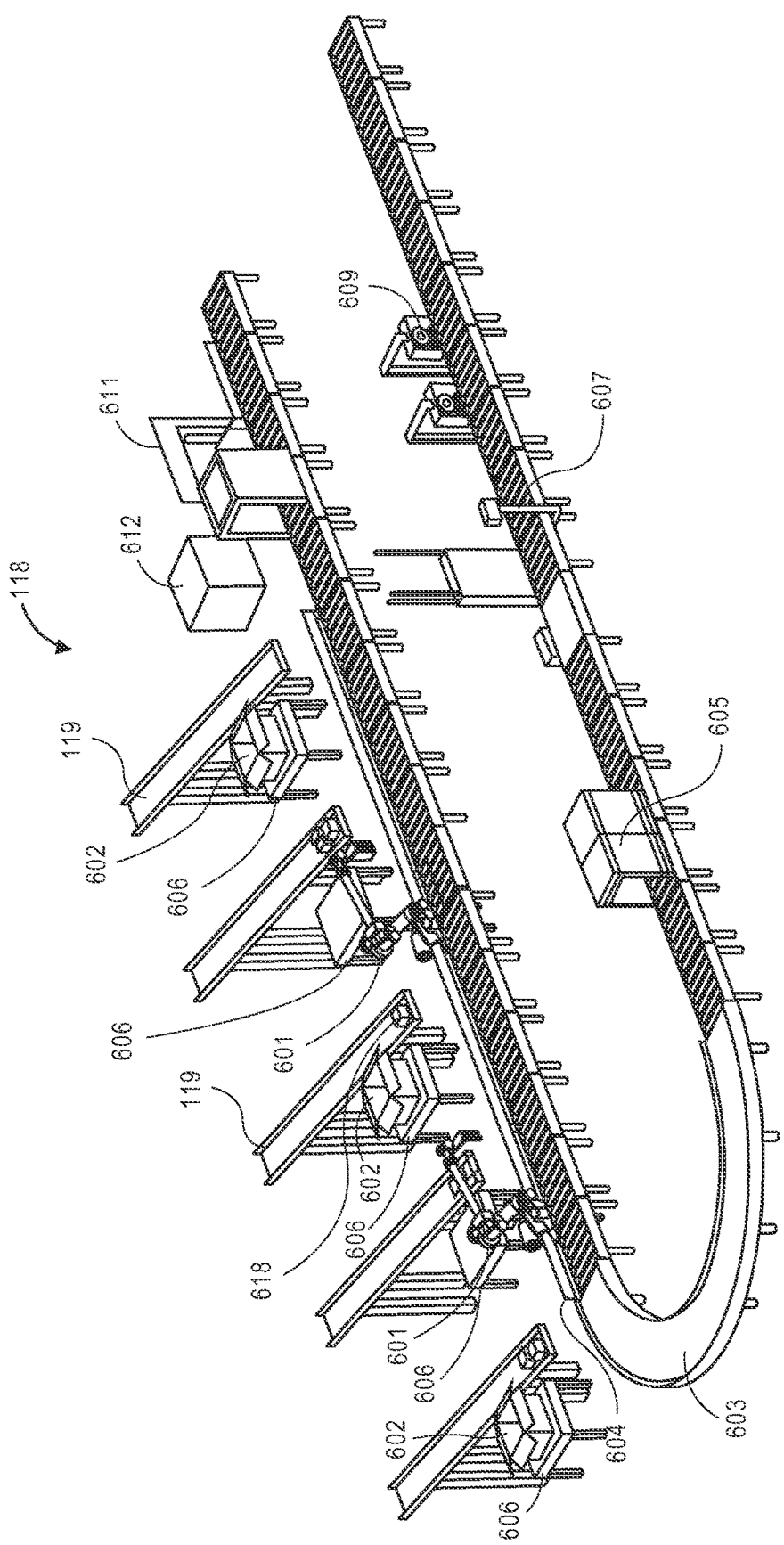
FIG. 6 is a diagram of a packing station, according to an implementation.

FIG. 6 is a diagram of a packing station 118, according to an implementation. As discussed above, picked items that are to be used to fulfill a shipment set are routed by an automated sorter and deposited into a packing slot 119 associated with the item and/or the shipment set. When all the items of the shipment set are positioned in the packing slot 119, an automated device 601, such as a robotic arm, is used to pick the items from the packing slot 119 and place the items into a container 602 that is sent along the conveyor 603 to a shipping station, as discussed above.

To facilitate packing of items, the materials handling control system sends instructions to an automated container erection device 611 that causes the automated container erection device 611 to erect a container. The automated container erection device 611 may utilize corrugate 612 to erect a container 602 into which one or more items 618 are placed for shipping. In some implementations, the automated container erection device may be an EM6 or EM7-25 packaging machine available from Packsize® International LLC, a Box on Demand™ packaging machine. In other implementations, the automated container erection device 611 may be a different device that is configured to erect a container from a prefabricated material of a specific size and/or shape.

The erected container is routed along the conveyor 603 to a position of the packing slot 119 from which items are to be picked and packed into the container. An automated device 601 picks the erected container 602 from the conveyor 603 and places the erected container on a pack assembly 606 so that items from the packing slot 119 can be packed into the container 602.

When items of a shipment arrive at the packing slot 119, the materials handling control system may send instructions to the automated device 601 that cause the automated device to position itself adjacent the packing slot 119, pick the items from the packing slot, and place the items in the container 602. In some implementations, the automated device may be mounted on a rail 604 so that the automated device may move along the packing slots 119 and position itself adjacent a packing slot from which the automated device is to pick items. The instructions from the materials handling control system may indicate the packing slot 119 from which the items are to be picked, the order in which the items are to be picked, the orientation and/or position in which the items are to be placed into the container 602, etc.

When all the items have been picked from the packing slot 119 and placed into the container 602, the instructions sent from the materials handling control system cause the automated device to return the container 602 to the conveyor and cause the conveyor 603 to route the container 602 to one or more automated devices 605. The one or more automated devices receive instructions that cause the one or more automated devices to include any additional needed dunnage and/or other materials (e.g., advertising materials) into the container 602 and seal the container, for example, using packing tape to secure the exterior edges of the container 602.

When dunnage and/or other material has been added to the container and the container sealed, the instructions cause the conveyor 603 to route the container to an automated check-weight station 607 that weighs the packed container 602 to confirm that the weight of the packed container corresponds with the expected weight of the container. For example, the materials handling control system maintains item information including the weight of the items and calculates the expected weight of the container based on the contained items, container weight and weight of the added dunnage and/or other materials. If the expected weight and the actual weight do not correspond within a defined tolerance, the container may be routed to a check station for review and/or additional processing.

If the actual weight of the container is within the defined tolerance of the expected weight of the container, the instructions cause the conveyor 603 to route the container to an automated label applicator 609.

The automated label applicator 609 receives instructions from the materials handling control system that cause the automated label applicator 609 to apply a label to the container 602. The label may identify a destination (e.g., delivery address) to which the container is to be transported. In some implementations, the label may be printed by the automated label applicator and applied to the container. In other implementations, the automated label applicator may utilize a laser or other device to imprint the label directly onto the container. For example, a laser may be utilized to imprint a delivery destination directly onto the corrugate of the container 602 without the need to affix a separate label to the container.

Once the label has been applied to the container, the instructions cause the conveyor 603 to route the container 602 to a shipping station so that the container can be placed on a transportation vehicle and transported from the AMHF, as discussed above.

Figure 7:
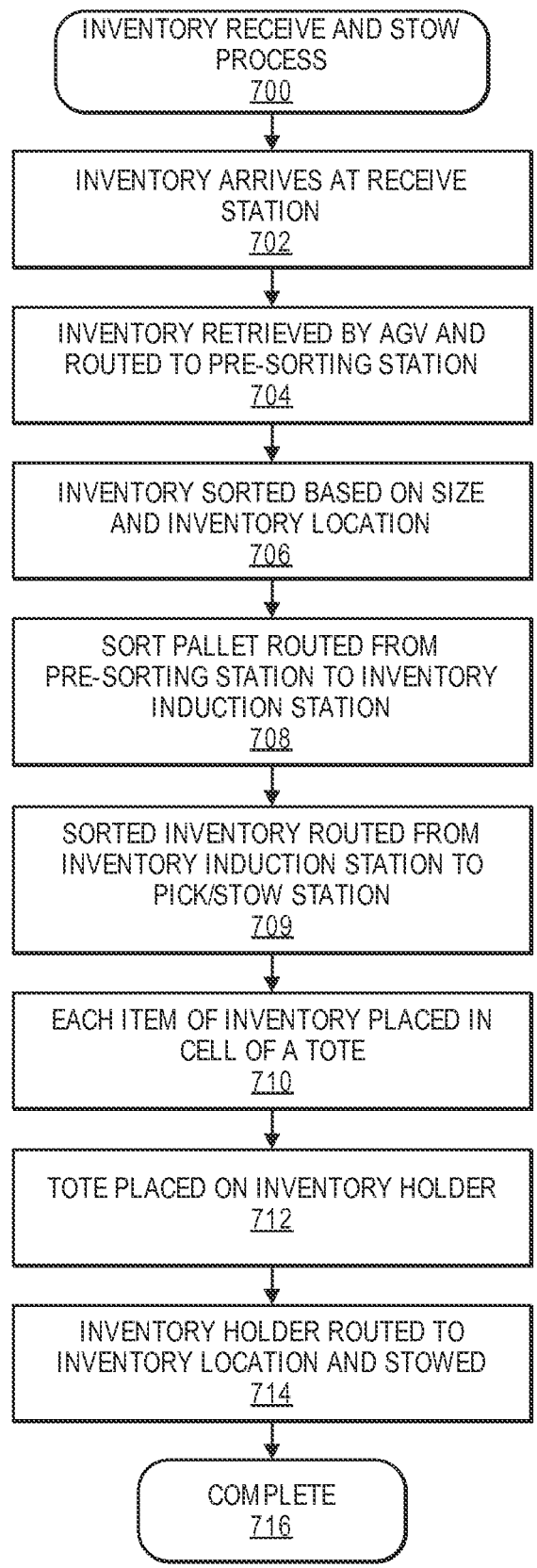
FIG. 7 is a flow diagram illustrating an example inventory receive process, according to an implementation.

FIG. 7 is a flow diagram illustrating an example inventory receive process, according to an implementation. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 700 begins upon a determination that inventory has arrived at a receive station, 702. For example, when a transportation vehicle arrives at the AMHF, the vehicle is identified and the materials handling control system determines the inventory items contained in that vehicle. For example, the materials handling control system may maintain a data store of inbound inventory items and an association of those items with a transportation identifier.

In response to determining that inventory has arrived at a receive station, instructions are sent to a first automated device, such as an AGV, to retrieve a pallet or other transportation unit that includes a plurality of inventory from the transportation vehicle and route the pallet to a pre-sorting station, as in 704. For example, the first automated device may receive instructions that identify a position of the pallet on the transportation vehicle and/or the AGV may retrieve a first pallet, determine an identifier associated with the pallet and provide that information to the materials handling control system. The materials handling control system, upon receiving from the first automated device an indication of a pallet of items retrieved from the transportation vehicle, determines a pre-sorting station to which the pallet is to be routed and sends instructions to the first automated device to route the pallet to the determined pre-sorting station. For example, the materials handling control system may determine, based on the inventory items associated with the pallet, a size and shape of those items and/or an inventory area at which the items are to be stowed. Based on that information, a pre-sorting station may be selected that includes sort pallets that have similar sized items and/or that are to be routed to the same inventory area.

At the pre-sorting station, a second automated device receives instructions to pick items from the receive pallet and sort those items to particular sort pallets located at the pre-sorting station, as in 706. For example, the second automated device may receive instructions that include an identification of each item contained on the receive pallet and a sort pallet to which the item is to be placed. When the second automated device picks an item from the receive pallet, the item is determined and placed by the automated device on the sort pallet indicated in the instructions. For example, the item, or a tote containing the item, may be identified based on an identifier (e.g., barcode, QR code, RFID, etc.) when the item is picked.

As sort pallets are stacked with items, instructions are sent to a third automated device, such as an AGV, to retrieve the pallet from the pre-sort station and route the pallet to an inventory induction station, as in 708. The inventory induction station may represent a station where inventory passes from an area that may be occupied by humans, such as the receive stations, to an area that is not occupied by humans, such as the inventory area of the AMHF.

Likewise, instructions may be sent to a fourth automated device positioned within the inventory area that cause the fourth automated device to pick the sort pallet from the inventory induction station and route the sort pallet to a pick/stow station, as in 709. For example, a mobile drive unit within the inventory area may receive the instructions from the materials handling control system and execute the instructions which cause the mobile drive unit to retrieve the sort pallet from the inventory induction station and route the sort pallet to a pick/stow station. The pick/stow station may be identified in the instructions, or the mobile drive unit may select the nearest available pick/stow station.

At the pick/stow station, one or more automated devices receive instructions that cause the automated device(s) to pick each of the items from the sort pallet and place the items into a cell of a tote, as in 710. As discussed above with respect to FIG. 3, a first automated device may present a first tote of items from the sort pallet and present a second tote with one or more cells from an inventory holder to a second automated device. The instructions may cause the second automated device to pick an item from the first tote and stow the item in a cell of the second tote. When the items from the sort pallet that are to be placed in cells of the presented second tote have been stowed in those cells, the instructions cause the first automated device to place the second tote on an inventory holder, as in 712.

This process of placing items into cells of totes may be done for each item included on the sort pallet. Each of the items may be placed in an individual cell of a tote. It will be appreciated that items from a sort pallet may be placed in many different totes that are presented from many different inventory holders. In some implementations, multiple totes from the sort pallet and/or inventory holders may be presented to the second automated device at the same time.

Once totes for an inventory holder have been picked, filled with associated items from the sort pallet and returned to the inventory holder, the instructions cause another automated device, such as a mobile drive unit, to route the inventory holder from the pick/stow station to an inventory location within the inventory area and stow the inventory holder at the inventory location, as in 714. The example process then completes, as in 716.

Figure 8:
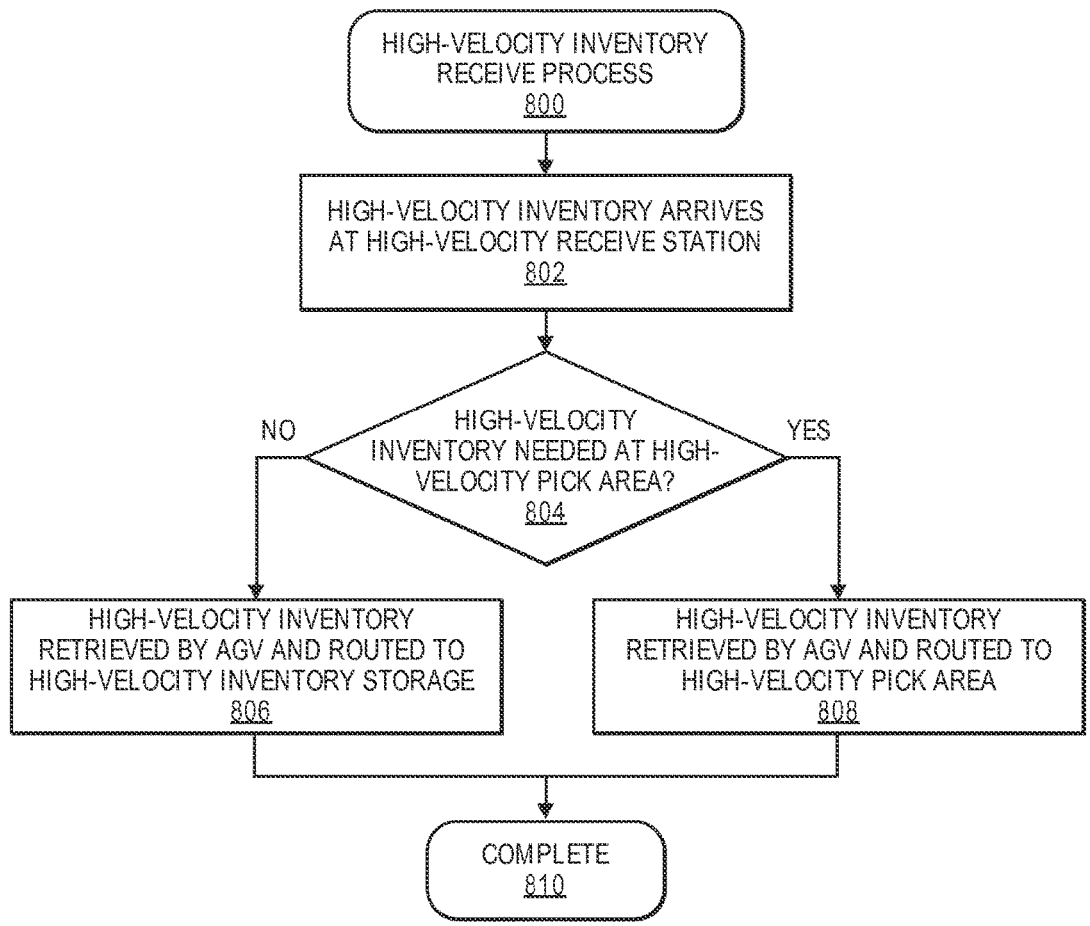
FIG. 8 is a flow diagram illustrating an example high-velocity inventory receive process, according to an implementation.

FIG. 8 is a flow diagram illustrating an example high-velocity inventory receive process 800, according to an implementation. The example process 800 begins upon a determination that high-velocity inventory has arrived at a high-velocity receive station, 802. For example, when a transportation vehicle arrives at the AMHF, the vehicle is identified and the materials handling control system determines the inventory items contained in that vehicle and determines that some or all of the items are high-velocity items. Likewise, in some implementations, it may be determined if some or all of the items are configured to be shipped from the AMHF without being placed in a container. Such items may be treated as high-velocity items for purposes of the example process 800.

In response to determining that one or more high-velocity items have arrived at a high-velocity receive station, a determination is made as to whether that type of high-velocity item is needed for replenishment at the high-velocity pick area, as in 804. For example, as discussed above, the AMHF may include a high-velocity inventory storage area and a high-velocity pick area. Generally, high-velocity items are picked from the high-velocity pick area for fulfillment of the shipment set and high-velocity items in the high-velocity pick area are replenished with high-velocity items from the high-velocity inventory storage area. However, if replenishment of the received high-velocity item is currently needed, it may be determined in the example process 800 that the received type of high-velocity item is needed at the high-velocity pick area. If it is determined that the received high-velocity item is needed at the high-velocity pick area, instructions are sent to a first automated device within the receive station, such as an AGV, that cause the first automated device to retrieve the high-velocity item from the transportation vehicle and route the high-velocity item to the high-velocity pick area for use in fulfilling shipment sets for high-velocity items, as in 808. However, if it is determined that the received high-velocity item is not needed at the high-velocity pick area, instructions are sent to the first automated device within the receive station that cause the first automated device to retrieve the high-velocity items from the transportation vehicle and route the items to the high-velocity inventory storage area for storage, as in 806. After the high-velocity items have been routed to either the high-velocity pick area or the high-velocity inventory storage area, the example process 800 completes, as in 810.

Figure 9:
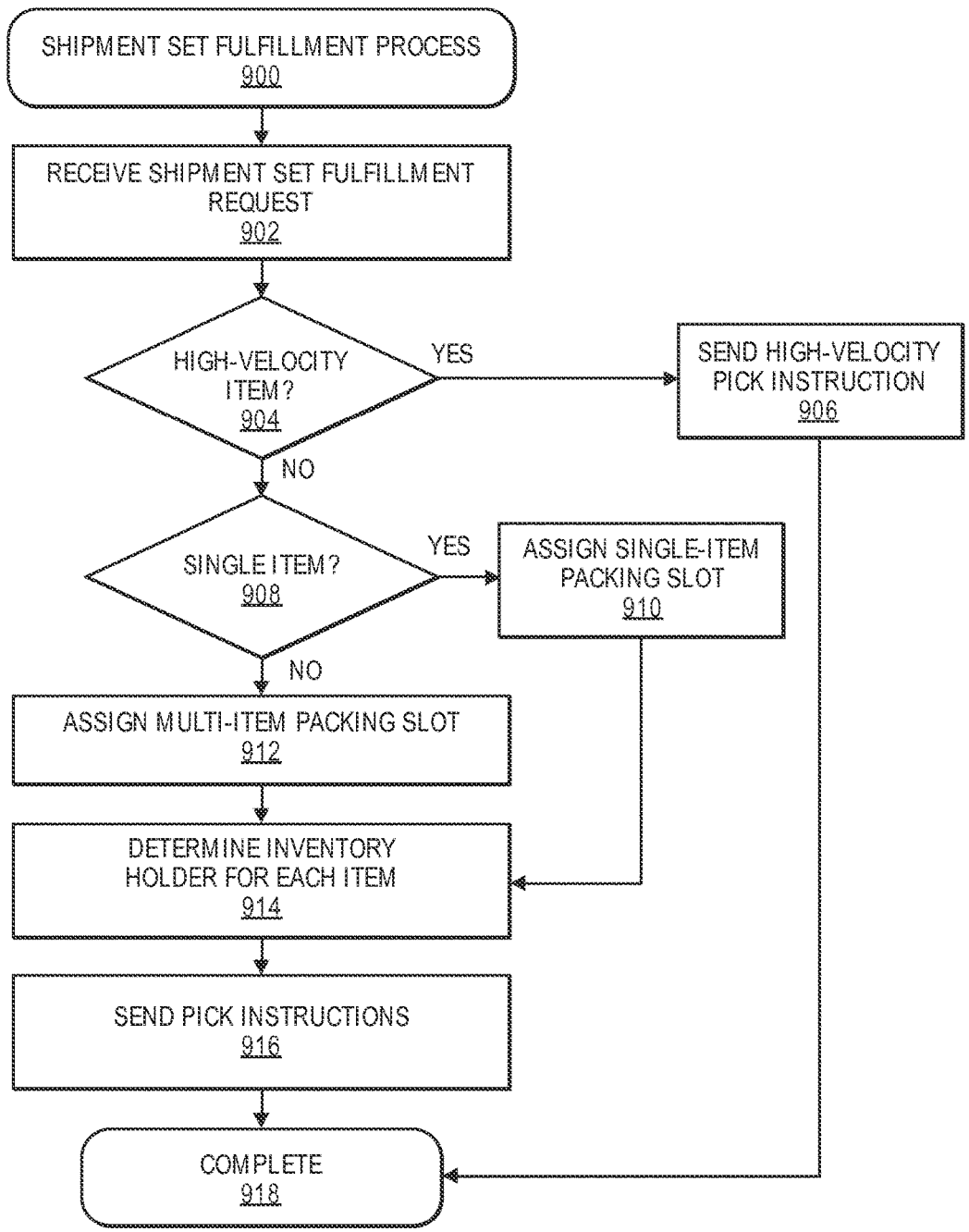
FIG. 9 is a flow diagram illustrating an example shipment set fulfillment process, according to an implementation.

FIG. 9 is a flow diagram illustrating an example shipment set fulfillment process 900, according to an implementation. The example process begins upon receipt of a request to fulfill a shipment set, as in 902. As discussed above, a shipment set includes an indication of one or more items that are to be fulfilled from the AMHF and packaged in a single container, or shipped without being packaged in an additional container.

Upon receiving a request to fulfill a shipment set, a determination is made as to whether the shipment set is a request for a high-velocity item, or an item that is stored in a high-velocity pick area for shipment without packing the item in a separate container, as in 904. If it is determined that the item is a high-velocity item or an item that is stored in a high-velocity pick area for shipment without packing the item in a separate container, high-velocity pick instructions are sent for picking of the item, as in 906. The high-velocity pick instructions may identify a position of the item within the high-velocity pick area such that an automated device within the high-velocity pick area can pick the item.

If it is determined that the item is not a high-velocity item, a determination is made as to whether the shipment set is for a single item, as in 908. If the shipment set is for a single item, the shipment set and corresponding item are assigned to a single item packing slot, as in 910. If the shipment set is not for a single item, the shipment set and corresponding items are assigned to a multi-item packing slot, as in 912. As discussed above, items to be fulfilled may be assigned to a packing slot and part of the flow of the item through the AMHF includes routing the item to an assigned packing slot. In some implementations, one or more of those packing slots may be allocated as a single item packing slot while others may be allocated as multi-item packing slots.

In addition to assigning a packing slot for the shipment set, inventory holders containing the item(s) of the shipment set are determined, as in 914. In some implementations, more than one quantity of the item may be available within the AMHF and some of those items may be stored in different inventory holders. One or more of a variety of processes may be used to select an inventory holder for each item of a shipment set. For example, an inventory holder containing the item that is currently being routed by an automated device may be preferred over a stowed inventory holder. An inventory holder with a larger quantity of empty cells within totes may be preferred over another inventory holder if a stow operation or consolidate operation may also be performed while the inventory holder is positioned at the pick/stow station, etc.

Once the inventory holders for each item of the shipment set are determined, instructions are sent to respective automated devices within the inventory area to pick the inventory holder and route the inventory holder to a pick/stow station. This may be done for many inventory holders which may be located on the same or different levels of the AMHF. The pick instructions may identify the inventory holder and/or the position of the inventory holder. Likewise, in some implementations, the pick instructions may identify a pick/stow station to which the inventory holder is to be routed. Still further, the pick instructions may include routing information indicating a route that the automated device is to take to navigate from its current position to the inventory location of the inventory holder and from the inventory location of the inventory holder to the pick/stow station. In other implementations, some or all of the routing and/or pick/stow station selection may be performed by the automated device. Upon sending the pick instructions, the example process 900 completes, as in 918.

Figure 10:
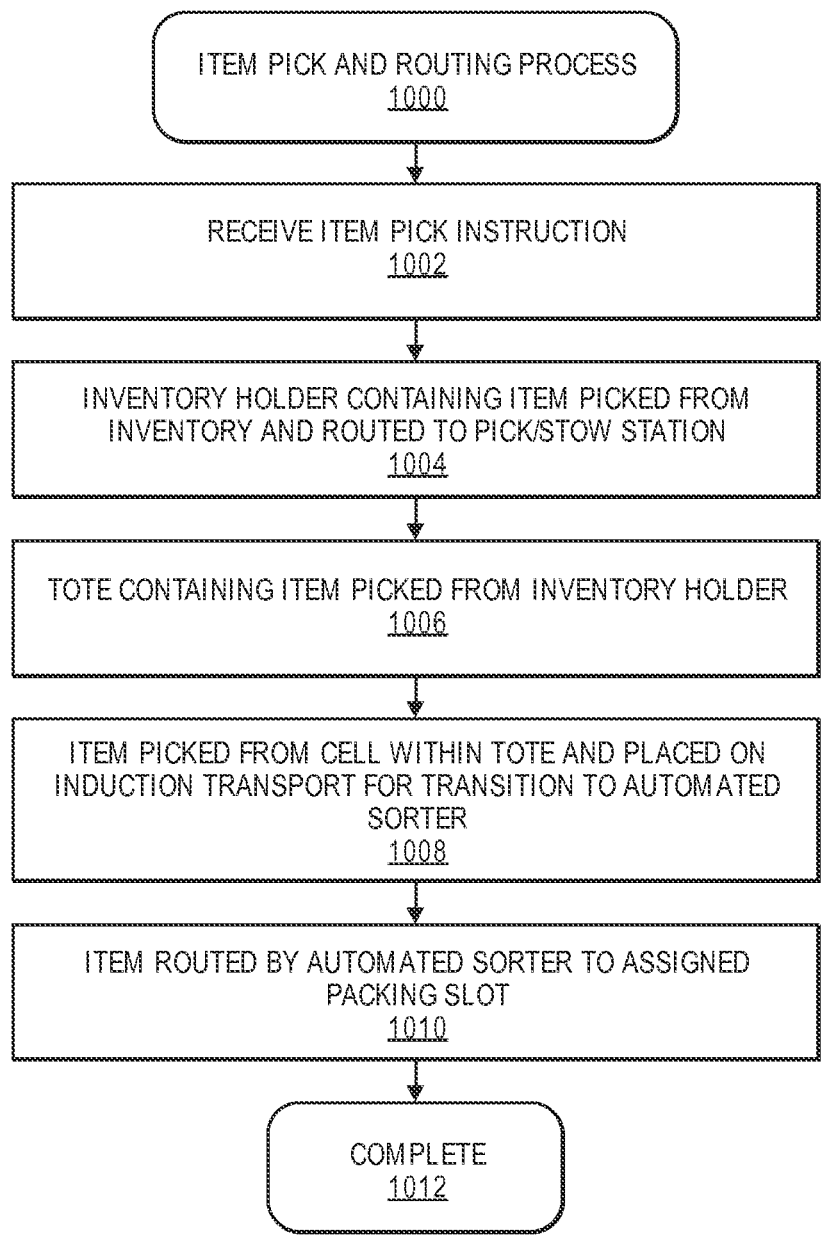
FIG. 10 is a flow diagram illustrating an example item pick and routing process, according to an implementation.

FIG. 10 is a flow diagram illustrating an example item pick and routing process 1000, according to an implementation. The example process begins upon receipt of an item pick instruction by an automated device positioned within an inventory area, as in 1002. In response to receiving the pick instructions, the automated device executes the instructions, navigates to the location of the inventory holder indicated in the pick instructions, picks the inventory holder, and routes the inventory holder to a pick/stow station, as in 1004.

When the inventory holder arrives at the pick/stow station, as discussed above, one or more totes are picked from the inventory holder, as in 1006, and the items associated with the shipment set are picked from cells of picked totes and placed on an induction transport for transition to the automated sorter, as in 1008. For example, the pick instructions may indicate to a first automated device at the pick/stow station a position or identification of a tote located on the inventory holder. The first automated device may utilize those instructions to pick the indicated tote from the inventory holder and present the picked tote to a second automated device so that the second automated device can pick the item from a cell of the tote. The pick instructions may indicate to the second automated device a cell identification or position within the presented tote from which the item is to be picked. When the item is picked from the indicated cell of the tote, the second automated device places the item on the induction transport such that the item is routed to and inducted onto the automated sorter.

Instructions are then executed that cause the automated sorter to route the picked item to an assigned packing slot and dispatch the item into the packing slot, as in 1010. For example, if the automated sorter is a cross-belt sorter, instructions may indicate when a cross belt upon which the item is positioned is to be rotated and a direction of rotation. The rotation of the cross belt at the indicated position will cause the inducted item to be dispatched into a packing slot at that location. Once the item is dispatched into the packing slot, the example process 1000 completes, as in 1012.

Figure 11:
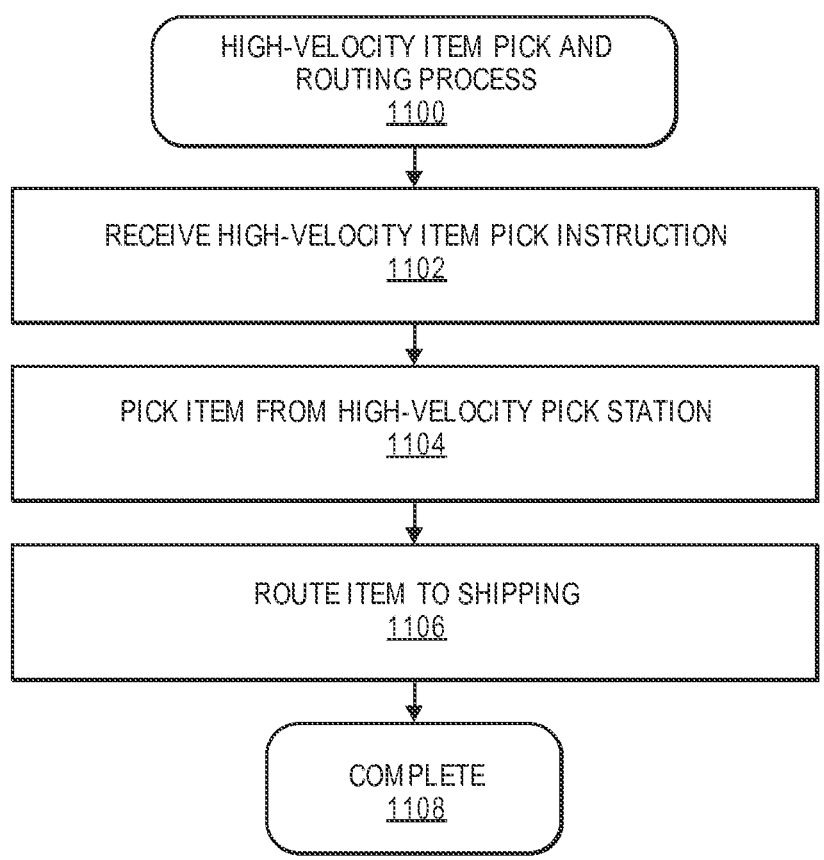
FIG. 11 is a flow diagram illustrating an example high-velocity item pick and routing process, according to an implementation.

FIG. 11 is a flow diagram illustrating an example high-velocity item pick and routing process 1100, according to an implementation. The example process 1100 begins upon receipt of a high-velocity item pick instruction by an automated device positioned within a high-velocity pick area, as in 1102. In response to receiving the high-velocity pick instruction, the automated device executes the instruction, navigates to the location of the high-velocity item, picks the item and routes the item to a conveyor, as in 1104. The conveyor receives instructions to either route the high-velocity item directly to the shipping station or to route the item to a packing station, as in 1106. Upon routing the item to the shipping station or to the packing station, the example process 1100 completes, as in 1108.

Figure 12:
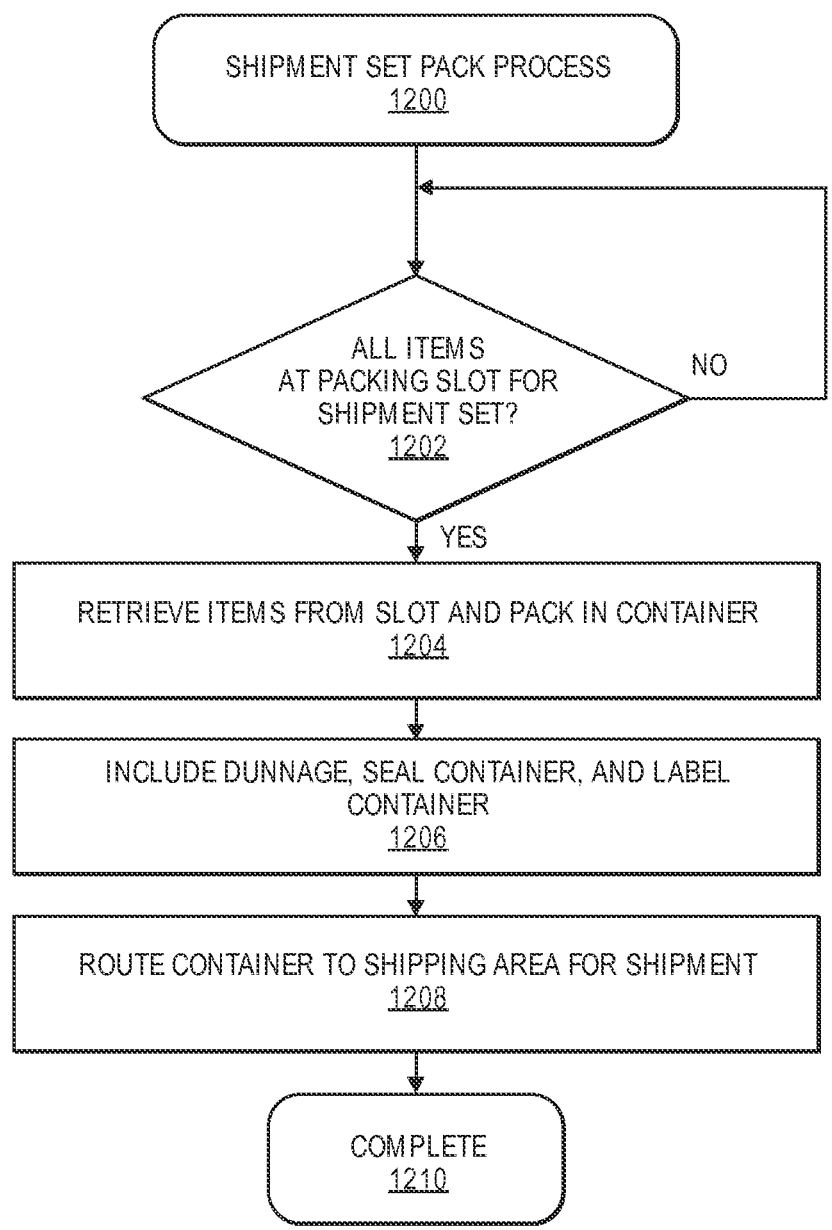
FIG. 12 is a flow diagram illustrating an example shipment set pack process, according to an implementation.

FIG. 12 is a flow diagram illustrating an example shipment set pack process 1200, according to an implementation. The example process 1200 begins by determining if all items associated with a shipment set and/or associated with a packing slot have been dispatched into the packing slot, as in 1202. If it is determined that not all of the items have arrived, the example process 1200 remains at decision block 1202. When it is determined that all items have arrived at the packing slot, an automated device at the packing station executes instructions that cause the automated device to pick the items from the packing slot and pack the items in a container, as in 1204. The instructions may indicate an order at which the items are to be picked from the packing slot, an order in which the items are to be placed into the container, an orientation and/or position at which the items are to be placed into the container, etc. Once the automated device has placed the items into the container, another automated device may include any additional dunnage needed to fill the container and protect the items during transport. For example, the automated device may scan the internal cavity of the container to determine an amount of space remaining in the container after the items are placed in the container. Based on the determined amount of space remaining, the automated device may include dunnage sufficient to fill the space remaining in the container, thereby protecting the items during transport. Likewise, instructions may cause one or more automated devices to close and seal the container, and apply a label to the container, as in 1206. As discussed above, the label may be printed and applied to the container or the label may be printed directly onto the container.

After the container has been sealed and labeled, the conveyor executes instructions that cause the conveyor to autonomously route the container to a shipping area for shipment, as in 1208. Finally, the example process 1200 completes, as in 1210.

Various operations of a materials handling control system, such as those described herein, may be executed on one or more computer systems, interacting with various other devices in a materials handling facility, according to various implementations. One such computer system is illustrated by the block diagram in FIG. 13. In the illustrated implementation, a computer system 1300 includes one or more processors 1310A, 1310B through 1310N, coupled to a non-transitory computer-readable storage medium 1320 via an input/output (I/O) interface 1330. The computer system 1300 further includes a network interface 1340 coupled to the I/O interface 1330, and one or more input/output devices 1350. In some implementations, it is contemplated that a materials handling control system may be implemented using a single instance of the computer system 1300, while in other implementations, multiple such systems or multiple nodes making up the computer system 1300 may be configured to host different portions or instances of a materials handling control system. For example, in one implementation, some data sources or services (e.g., coordinating receive and/or stow operations) may be implemented via one or more nodes of the computer system 1300 that are distinct from those nodes implementing other data sources or services (e.g., coordinating pick and/or shipping operations). In some implementations, a given node may implement the functionality of more than one component of a materials handling control system.

In various implementations, the computer system 1300 may be a uniprocessor system including one processor 1310A, or a multiprocessor system including several processors 1310A-1310N (e.g., two, four, eight, or another suitable number). The processors 1310A-1310N may be any suitable processor capable of executing instructions. For example, in various implementations, the processors 1310A-1310N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1310A-1310N may commonly, but not necessarily, implement the same ISA.

The non-transitory computer-readable storage medium 1320 may be configured to store executable instructions and/or data accessible by the one or more processors 1310A-

1310N. In various implementations, the non-transitory computer-readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer-readable storage medium 1320 as program instructions 1325 and data storage 1335, respectively. In other implementations, program instructions and/or data may be received, sent or stored upon different types of computer-accessible media, such as non-transitory media, or on similar media separate from the non-transitory computer-readable storage medium 1320 or the computer system 1300. Generally speaking, a non-transitory, computer-readable storage medium may include storage media or memory media such as magnetic or optical media, e.g., disk or CD/DVD-ROM coupled to the computer system 1300 via the I/O interface 1330. Program instructions and data stored via a non-transitory computer-readable medium may be transmitted by transmission media or signals, such as electrical, electromagnetic, or digital signals, which may be conveyed via a communication medium, such as a network and/or a wireless link, such as may be implemented via the network interface 1340.

In one implementation, the I/O interface 1330 may be configured to coordinate I/O traffic between the processors 1310A-1310N, the non-transitory computer-readable storage medium 1320, and any peripheral devices in the device, including the network interface 1340 or other peripheral interfaces, such as input/output devices 1350. In some implementations, the I/O interface 1330 may perform any necessary protocol, timing or other data transformations to convert data signals from one component (e.g., non-transitory computer-readable storage medium 1320) into a format suitable for use by another component (e.g., processors 1310A-1310N). In some implementations, the I/O interface 1330 may include support for devices attached through various types of peripheral buses, such as a variant of the Peripheral Component Interconnect (PCI) bus standard or the Universal Serial Bus (USB) standard, for example. In some implementations, the function of the I/O interface 1330 may be split into two or more separate components, such as a north bridge and a south bridge, for example. Also, in some implementations, some or all of the functionality of the I/O interface 1330, such as an interface to the non-transitory computer-readable storage medium 1320, may be incorporated directly into the processors 1310A-1310N.

The network interface 1340 may be configured to allow data to be exchanged between the computer system 1300 and other devices attached to a network, such as the automated devices within the AMHF, and/or between nodes of the computer system 1300. In various implementations, the network interface 1340 may support communication via wired or wireless general data networks, such as any suitable type of Ethernet network. For example, the network interface 1340 may support communication via telecommunications/telephony networks such as analog voice networks or digital fiber communications networks, via storage area networks such as Fibre Channel SANs, or via any other suitable type of network and/or protocol.

Input/output devices 1350 may, in some implementations, include one or more displays, projection devices, audio output devices, keyboards, keypads, touchpads, scanning devices, voice or optical recognition devices, or any other devices suitable for entering or retrieving data by one or more computer systems 1300. Multiple input/output devices 1350 may be present in the computer system 1300 or may be distributed on various nodes of the computer system 1300. In some implementations, similar input/output devices may be separate from the computer system 1300 and may interact with one or more nodes of the computer system 1300 through a wired or wireless connection, such as over the network interface 1340.

Figure 13:
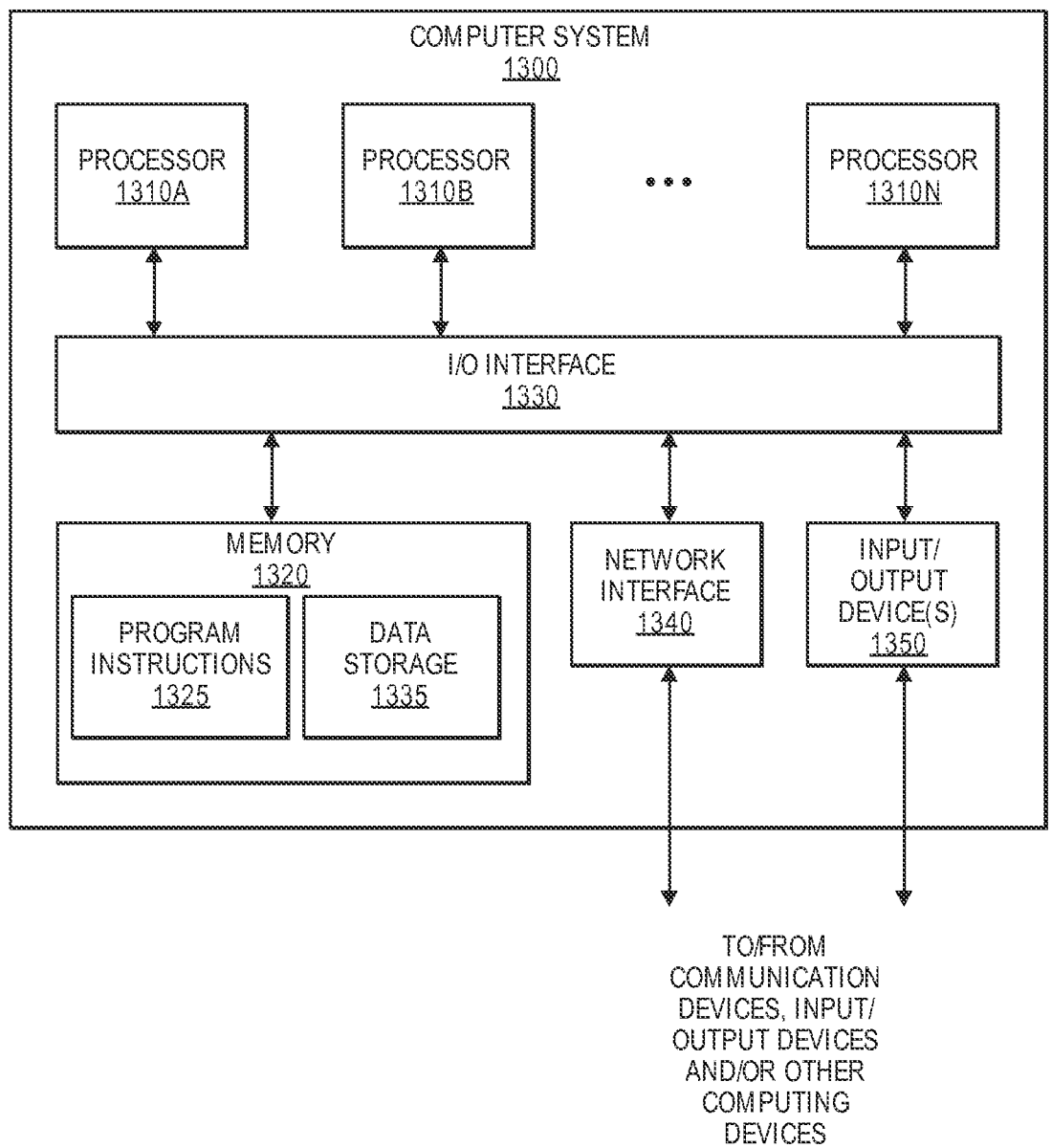
FIG. 13 is a block diagram illustrating an example computer system configured to coordinate the operation of the automated devices within the materials handling facility and coordinate the flow of items through the materials handling facility, according to an implementation.

As shown in FIG. 13, the computer-readable storage medium 1320 may include program instructions 1325 which may be configured to implement a materials handling control system and data storage 1335, which may comprise various tables, databases and/or other data structures accessible by the program instructions 1325. In one implementation, the program instructions 1325 may include various software modules configured to implement and coordinate the flow of items through the AMHF, to generate and send instructions to the automated devices within the AMHF that cause the automated devices to pick items, route items, etc. The data storage 1335 may include various data stores for maintaining one or more item lists, data representing physical characteristics of items and/or other item parameter values (such as those illustrated as being stored in Table 1), container parameter values (such as those illustrated as being stored in Table 2), packing configurations (not shown), inventory item locations, shipping reports, etc.

Table 1 illustrates five example items for which data may be included in an item parameter data store. In this example, the entry for each item includes a corresponding unique identifier, name, and type in columns 1-3. The item parameter data store may also include columns for storing values for various physical parameters of each item (columns 4-6), which in this example includes the item height, length, and width.

TABLE 1

| item ID | item name | item type | item height (in) | item length (in) | item width (in) |
|---|---|---|---|---|---|
| 4982 | book1 | book | 8.40 | 6.40 | 2.59 |
| 4325 | book2 | book | 8.29 | 6.40 | 2.59 |
| 2309 | plate38 | plate | 0.92 | 9.40 | 9.40 |
| 0873 | shoe17 | shoe | 14.00 | 8.00 | 6.54 |
| 1832 | DVD1 | DVD | 7.48 | 5.31 | 0.55 |

While not shown, in other implementations, additional information may be stored in an item parameters data store, such as the volume or weight of the item, a confidence level for the item dimension values, information on statistical variances in the dimension values, whether the item has been designated to receive special damage protection, inventory locations of the items, tote identifiers in which the items are stored, item quantities, inventory holders on which the items are located, etc. In some implementations, a manufacturer, supplier or vendor may provide item dimensions for the items shown in Table 1. In other implementations, the item dimension values may be values measured automatically, or may be values that have been estimated based on various containers in which the items have been handled.

In some implementations, dimension values and/or other parameter values for containers may also be stored in one or more tables, databases, or other data structures, such as the container parameters data store illustrated in Table 2 below. In this example, a container identifier, a container name, and a container type are stored in each entry of Table 2 in columns 1-3. Dimension values for various containers are shown in columns 4-6. In some implementations, a manufacturer, supplier or vendor of a container may provide the values of various container parameters, including container dimensions. In other implementations, container parameters may be determined by measuring one or more instances of the container.

In this example, the available containers include three types of boxes in which items may be packed.

TABLE 2

| container ID | container name | container type | height (inches) | length (inches) | width (inches) |
|---|---|---|---|---|---|
| 413 | smallbox1 | box | 19.0 | 13.0 | 11.75 |
| 293 | smallbox2 | box | 22.0 | 18.0 | 11.75 |
| 338 | bigbox1 | box | 24.0 | 16.0 | 16.00 |

In the example illustrated by Table 2, the values for the height, length, and width are shown for each container. In some implementations, a manufacturer or supplier may provide the volume along with the dimensions, while in other implementations, the materials handling control system may calculate the volume from supplied or measured dimensions. In some implementations, additional information regarding various containers (e.g., the weight or volume of the containers, a strength rating, or an indication of protective packaging materials or filler to be used in preparing items for shipment in the containers) may be maintained in a container parameters data store. In general, such a data store may include the values of more, fewer, or different parameters than those illustrated in Table 2.

In various implementations, the parameter values and other data illustrated herein as being included in one or more data stores may be combined with other information not described or may be partitioned differently into more, fewer, or different data structures. In some implementations, data stores used in a materials handling control system, or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different implementations. Similarly, in other implementations, different software modules and data stores may make up a materials handling control system and/or any of the various components thereof described herein.

Those skilled in the art will appreciate that the computing system 1300 is merely illustrative and is not intended to limit the scope of implementations. In particular, the computing system and devices may include any combination of hardware or software that can perform the indicated functions, including computers, network devices, internet appliances, wireless phones, etc. The computing system 1300 may also be connected to other devices that are not illustrated, or instead may operate as a stand-alone system. In addition, the functionality provided by the illustrated components may in some implementations be combined in fewer components or distributed in additional components. Similarly, in some implementations the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computer system 1300 may be transmitted to computer system 1300 via transmission media or signals, such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Accordingly, the techniques described herein may be practiced with other computer system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various processes and systems as illustrated in the figures and described herein represent example implementations. The processes and systems may be implemented in software, hardware, or a combination thereof in other implementations. Similarly, the order of any process may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system for automated picking and routing of an item within a materials handling facility, comprising:
   a first automated device configured to pick an inventory holder from an inventory location within the materials handling facility and route the inventory holder to a pick/stow station, wherein the inventory holder contains a tote that includes the item;
   a second automated device positioned at the pick/stow station configured to pick the item from the tote;
   an automated sorter configured to route the item to a packing slot associated with the item;
   a third automated device configured to retrieve the item from the packing slot and place the item in a container; and
   at least one additional automated device configured to insert protective material in the container, insert additional material in the container, seal the container, or apply a shipping label to the container.

2. The system of claim 1, further comprising:
   a fourth automated device positioned at the pick/stow station configured to pick the tote from the inventory holder and position the tote at a location within the pick/stow station to enable picking of the item by the second automated device.

3. The system of claim 1, wherein:
   the tote includes a plurality of cells and the item is positioned in a cell of the plurality of cells.

4. The system of claim 1, further comprising:
   a conveyor configured to route the container to a shipping station; and
   a fourth automated device configured to load the container on a transportation vehicle.

5. The system of claim 1, further comprising:
   a materials handling facility control system in communication with each of the first automated device, the second automated device, the third automated device, and the automated sorter, wherein the materials handling facility control system is configured to send instructions to each of the first automated device, the second automated device, the third automated device, and the automated sorter to at least coordinate operation of the first automated device, the second automated device, the third automated device, and the automated sorter and to coordinate the automated picking and routing of the item.

6. The system of claim 1, wherein the tote includes:
   a plurality of dividers that may be positioned within the tote for forming a plurality of cells, wherein the plurality of dividers may be positioned in different configurations to form a different number of cells or different sizes of cells.

7. The system of claim 6, wherein the second automated device is further configured to place or reposition the plurality of dividers within the tote.

8. A system for automated picking and routing of an item within a materials handling facility, comprising:
   a first automated device configured to pick an inventory holder from an inventory location within the materials handling facility and route the inventory holder to a pick/stow station, wherein the inventory holder contains a tote that includes the item;
   a second automated device positioned at the pick/stow station configured to pick the item from the tote;
   an automated sorter configured to route the item to a packing slot associated with the item;
   a third automated device configured to retrieve the item from the packing slot and place the item in a container;
   another first automated device configured to pick a second inventory holder from a second inventory location within the materials handling facility and route the second inventory holder to a second pick/stow station, wherein the second inventory holder contains a second tote that includes a second item, wherein the item and the second item are part of a shipment set;
   another second automated device positioned at the second pick/stow station configured to pick the second item from the second tote; and
   an induction transport configured to transport the second item from the second pick/stow station to the automated sorter;
   wherein:
      the automated sorter routes the second item to the packing slot; and
      the third automated device retrieves the item and the second item from the packing slot and places the item and the second item in the container.

9. The system of claim 8, wherein the automated sorter encompasses the first automated device, the inventory holder, the inventory location, the second automated device, the pick/stow station, the other first automated device, the second inventory holder, the second inventory location, the other second automated device, and the second pick-stow station.

10. The system of claim 8, wherein:
    the inventory location is on a first level of the materials handling facility; and
    the second inventory location is on a second level of the materials handling facility.

11. The system of claim 10, wherein the automated sorter is the only automated sorter included in the system.

12. A system for automated picking and routing of an item within a materials handling facility, comprising:
    a first automated device configured to pick an inventory holder from an inventory location within the materials handling facility and route the inventory holder to a pick/stow station, wherein the inventory holder contains a tote that includes the item;
    a second automated device positioned at the pick/stow station configured to pick the item from the tote;
    an automated sorter configured to route the item to a packing slot associated with the item; and
    a third automated device configured to retrieve the item from the packing slot and place the item in a container;
    wherein the automated sorter is a continuous conveyor and routes items to packing slots such that the item is routed from an induction location into the automated sorter to the packing slot in less than a single revolution around the automated sorter.

13. The system of claim 12, wherein the automated sorter encompasses the first automated device, the inventory holder, the inventory location, the second automated device, and the pick/stow station.

14. The system of claim 12, wherein the automated sorter is the only automated sorter included in the system.

15. The system of claim 12, wherein the automated sorter is configured to route items to a plurality of packing slots that are distributed at least one of around or on either side of the automated sorter.

16. The system of claim 15, wherein the third automated device comprises a plurality of third automated devices distributed around the automated sorter, each of the plurality of third automated devices being associated with one or more of the plurality of packing slots.

17. A computing system, comprising:
a processor; and
a memory coupled to the processor and storing program instructions that when executed by the processor cause the processor to at least:
send first instructions that cause one or more automated devices to at least:
autonomously retrieve an item from a receive station within a materials handling facility;
autonomously route the item from the receive station to an inventory location within the materials handling facility; and
autonomously stow the item at the inventory location;
receive a request to include the item in a shipment set that is to be shipped from the materials handling facility;
send second instructions that cause the one or more automated devices to at least:
autonomously retrieve the item from the inventory location;
autonomously at least one of insert protective material in a container with the item, insert additional material in the container with the item, seal the container with the item, or apply a shipping label to the item or the container with the item;
autonomously route the item to a shipping station; and
autonomously place the item on a transportation unit that will transport the item from the materials handling facility.

18. The computing system of claim 17, wherein the first instructions further cause the one or more automated devices to at least:
autonomously retrieve a plurality of items, including the item, from the receive station within the materials handling facility; and
autonomously sort the plurality of items based at least in part on a size of each of the plurality of items or a destination inventory location for each of the plurality of items.

19. The computing system of claim 17, wherein the first instructions further cause the one or more automated devices to at least:
determine that the item is at least one of a high-velocity item or an item that is transported from the materials handling facility without being placed inside a container prior to transport.

20. The computing system of claim 17, wherein the second instructions further cause the one or more automated devices to at least:
autonomously route an inventory holder containing the item from the inventory location to a pick/stow station;
autonomously pick the item from a tote located in the inventory holder; and
autonomously pack the item into the container prior to the item being autonomously routed to the shipping station.

21. The computing system of claim 20, wherein the tote includes a plurality of cells, each cell containing an inventory item.

* * * * *